(12) United States Patent
Karthikeyan et al.

(10) Patent No.: US 8,741,484 B2
(45) Date of Patent: Jun. 3, 2014

(54) DOPED POSITIVE ELECTRODE ACTIVE MATERIALS AND LITHIUM ION SECONDARY BATTERY CONSTRUCTED THEREFROM

(75) Inventors: Deepak Kumaar Kandasamy Karthikeyan, Foster City, CA (US); Subramaninan Venkatachalam, Pleasanton, CA (US); Shabab Amiruddin, Fremont, CA (US); Herman A. Lopez, Sunnyvale, CA (US); Sujeet Kumar, Newark, CA (US)

(73) Assignee: Envia Systems, Inc., Newark, CA (US)

( * ) Notice: Subject to any disclaimer, the term of this patent is extended or adjusted under 35 U.S.C. 154(b) by 451 days.

(21) Appl. No.: 12/753,312

(22) Filed: Apr. 2, 2010

(65) Prior Publication Data

US 2011/0244331 A1    Oct. 6, 2011

(51) Int. Cl.
    *H01M 4/13*     (2010.01)
(52) U.S. Cl.
    USPC ... 429/231.95; 429/223; 429/224; 429/231.3; 429/231.6
(58) Field of Classification Search
    USPC ............... 429/218.1, 223, 224, 231.3, 231.6, 429/231.95
    See application file for complete search history.

(56) References Cited

U.S. PATENT DOCUMENTS

| 5,374,491 | A  | 12/1994 | Brannan et al. |
| 5,658,693 | A  | 8/1997  | Thackeray et al. |
| 5,674,645 | A  | 10/1997 | Amatucci et al. |
| 6,037,095 | A  | 3/2000  | Miyasaka |
| 6,087,042 | A  | 7/2000  | Sugiyama et al. |
| 6,168,887 | B1 | 1/2001  | Dahn et al. |
| 6,183,718 | B1 | 2/2001  | Barker et al. |
| 6,248,477 | B1 | 6/2001  | Howard, Jr. et al. |
| 6,251,822 | B1 | 6/2001  | Peng et al. |
| 6,322,744 | B1 | 11/2001 | Kelley et al. |
| 6,337,156 | B1 | 1/2002  | Narang et al. |
| 6,372,385 | B1 | 4/2002  | Kweon et al. |

(Continued)

FOREIGN PATENT DOCUMENTS

| EP | 2264814 A1 | 12/2010 |
| EP | 2351122 A2 | 8/2011 |

(Continued)

OTHER PUBLICATIONS

Shin, Ho-suk et al. "Improvement of electrochemical properties of Li[Ni0.4Co0.2Mn(0.4-x)Mgx]O2-yFy cathode material at high voltage region" Electrochemica Acta 52 (2006) 1477-1482.*

(Continued)

*Primary Examiner* — Zachary Best
(74) *Attorney, Agent, or Firm* — Dardi & Herbert, PLLC; Peter S. Dardi

(57) ABSTRACT

Positive electrode active materials comprising a dopant in an amount of 0.1 to 10 mole percent of Mg, Ca, Sr, Ba, Zn, Cd or a combination thereof are described that have high specific discharge capacity upon cycling at room temperature and at a moderate discharge rate. Some materials of interest have the formula $Li_{1+x}Ni_{\alpha}Mn_{\beta-\delta}Co_{\gamma}A_{\delta}X_{\mu}O_{2-z}F_{z}$, where x ranges from about 0.01 to about 0.3, δ ranges from about 0.001 to about 0.15, and the sum $x+\alpha+\beta+\gamma+\delta+\mu$ can approximately equal 1.0. The materials can be coated with a metal fluoride to improve the performance of the materials especially upon cycling. The materials generally can have a tap density of at least 1.8 g/mL. Also, the materials can have an average discharge voltage of around 3.6 V.

18 Claims, 21 Drawing Sheets

(56) References Cited

U.S. PATENT DOCUMENTS

| | | |
|---|---|---|
| 6,383,687 B1 | 5/2002 | Gibbons et al. |
| 6,420,071 B1 | 7/2002 | Lee et al. |
| 6,428,766 B1 | 8/2002 | Fujino et al. |
| 6,489,060 B1 | 12/2002 | Zhang et al. |
| 6,528,208 B1 | 3/2003 | Thackeray et al. |
| 6,589,499 B2 | 7/2003 | Gao et al. |
| 6,596,435 B2 | 7/2003 | Kelley et al. |
| 6,660,432 B2 | 12/2003 | Paulsen et al. |
| 6,677,082 B2 | 1/2004 | Thackeray et al. |
| 6,680,143 B2 | 1/2004 | Thackeray et al. |
| 6,682,849 B2 | 1/2004 | Narang et al. |
| 6,730,429 B2 | 5/2004 | Thackeray et al. |
| 6,749,648 B1 | 6/2004 | Kumar et al. |
| 6,855,460 B2 | 2/2005 | Vaughey et al. |
| 6,872,491 B2 | 3/2005 | Kanai et al. |
| 6,964,828 B2 | 11/2005 | Lu et al. |
| 7,026,074 B2 | 4/2006 | Chen et al. |
| 7,078,128 B2 | 7/2006 | Lu et al. |
| 7,135,252 B2 | 11/2006 | Thackeray et al. |
| 7,166,385 B2 | 1/2007 | Ishida et al. |
| 7,201,994 B2 | 4/2007 | Watanabe et al. |
| 7,201,997 B2 | 4/2007 | Ishida et al. |
| 7,205,072 B2 | 4/2007 | Kang et al. |
| 7,229,717 B2 | 6/2007 | Yamaguchi et al. |
| 7,252,907 B2 | 8/2007 | Takeuchi et al. |
| 7,285,357 B2 | 10/2007 | Jordy et al. |
| 7,364,793 B2 | 4/2008 | Paulsen et al. |
| 7,368,071 B2 | 5/2008 | Dahn et al. |
| 7,393,476 B2 | 7/2008 | Shiozaki et al. |
| 7,416,813 B2 | 8/2008 | Fujihara et al. |
| 7,435,402 B2 | 10/2008 | Kang et al. |
| 7,452,631 B2 | 11/2008 | Kitao et al. |
| 7,468,223 B2 | 12/2008 | Thackeray et al. |
| 7,507,503 B2 | 3/2009 | Amine et al. |
| 7,517,613 B2 | 4/2009 | Yuasa et al. |
| 7,674,557 B2 | 3/2010 | Sun et al. |
| 7,927,506 B2 | 4/2011 | Park |
| 7,935,270 B2 | 5/2011 | Park |
| 2002/0055042 A1 | 5/2002 | Kweon et al. |
| 2002/0114995 A1 | 8/2002 | Thackeray et al. |
| 2002/0192148 A1 | 12/2002 | Kweon et al. |
| 2003/0082448 A1 | 5/2003 | Cho et al. |
| 2003/0087155 A1 | 5/2003 | Cho et al. |
| 2003/0108790 A1 | 6/2003 | Manthiram et al. |
| 2004/0076884 A1 | 4/2004 | Lee et al. |
| 2004/0091779 A1* | 5/2004 | Kang et al. ............ 429/231.1 |
| 2004/0151951 A1 | 8/2004 | Hyung et al. |
| 2005/0019670 A1 | 1/2005 | Amine et al. |
| 2005/0031942 A1 | 2/2005 | Hennige et al. |
| 2005/0058588 A1 | 3/2005 | Kang et al. |
| 2005/0202316 A1 | 9/2005 | Hwang et al. |
| 2005/0220700 A1 | 10/2005 | Suhara et al. |
| 2006/0051671 A1 | 3/2006 | Thackeray et al. |
| 2006/0051673 A1 | 3/2006 | Johnson et al. |
| 2006/0083991 A1 | 4/2006 | Ahn et al. |
| 2006/0147809 A1 | 7/2006 | Amine et al. |
| 2006/0188781 A1 | 8/2006 | Thackeray et al. |
| 2006/0257743 A1 | 11/2006 | Kuratomi et al. |
| 2006/0275667 A1 | 12/2006 | Watanabe et al. |
| 2007/0072080 A1 | 3/2007 | Inagaki et al. |
| 2007/0111098 A1 | 5/2007 | Yang Kook et al. |
| 2007/0122703 A1 | 5/2007 | Whitfield et al. |
| 2007/0160906 A1 | 7/2007 | Tooyama et al. |
| 2007/0202405 A1 | 8/2007 | Shizuka et al. |
| 2007/0212607 A1 | 9/2007 | Fujihara et al. |
| 2007/0218359 A1* | 9/2007 | Shimizu et al. ............ 429/223 |
| 2007/0292757 A1 | 12/2007 | Watanabe et al. |
| 2008/0102369 A1 | 5/2008 | Sakata et al. |
| 2008/0107968 A1 | 5/2008 | Patoux et al. |
| 2008/0118847 A1 | 5/2008 | Jung et al. |
| 2008/0135802 A1 | 6/2008 | Saito et al. |
| 2008/0157027 A1 | 7/2008 | Manthiram et al. |
| 2008/0193841 A1 | 8/2008 | Sun et al. |
| 2008/0241693 A1 | 10/2008 | Fukuchi et al. |
| 2008/0268347 A1 | 10/2008 | Ohzuku et al. |
| 2009/0087362 A1* | 4/2009 | Sun et al. ............ 423/179.5 |
| 2009/0127520 A1 | 5/2009 | Whitfield et al. |
| 2009/0155694 A1 | 6/2009 | Park |
| 2009/0263707 A1* | 10/2009 | Buckley et al. ............ 429/94 |
| 2009/0297947 A1 | 12/2009 | Deng et al. |
| 2009/0305131 A1 | 12/2009 | Kumar et al. |
| 2010/0086853 A1 | 4/2010 | Venkatachalam et al. |
| 2010/0086854 A1 | 4/2010 | Kumar et al. |
| 2010/0104944 A1 | 4/2010 | Saito et al. |
| 2010/0119942 A1 | 5/2010 | Kumar |
| 2010/0151332 A1 | 6/2010 | Lopez et al. |
| 2011/0017528 A1 | 1/2011 | Kumar et al. |
| 2011/0052981 A1 | 3/2011 | Lopez et al. |
| 2011/0052989 A1 | 3/2011 | Venkatachalam et al. |
| 2011/0076556 A1 | 3/2011 | Karthikeyan et al. |
| 2011/0111294 A1 | 5/2011 | Lopez et al. |
| 2011/0111298 A1 | 5/2011 | Lopez et al. |
| 2011/0136019 A1 | 6/2011 | Amiruddin et al. |
| 2011/0236751 A1 | 9/2011 | Amiruddin et al. |
| 2012/0028105 A1 | 2/2012 | Kumar et al. |
| 2012/0056590 A1 | 3/2012 | Amiruddin et al. |
| 2012/0070725 A1 | 3/2012 | Venkatachalam et al. |

FOREIGN PATENT DOCUMENTS

| | | |
|---|---|---|
| EP | 2499687 A2 | 9/2012 |
| JP | 57065674 A2 | 4/1982 |
| JP | 06-243871 | 9/1994 |
| JP | 09-045373 | 2/1997 |
| JP | 10-255837 | 9/1998 |
| JP | 3112138 | 9/2000 |
| JP | 2002-110167 | 4/2002 |
| JP | 3506397 | 12/2003 |
| JP | 2006-134816 | 5/2006 |
| JP | 2006-344425 A | 12/2006 |
| JP | 2007-220630 | 8/2007 |
| JP | 3276451 | 2/2008 |
| JP | 2008-536285 A | 9/2008 |
| JP | 2008-258160 A | 10/2008 |
| JP | 5023541 | 6/2012 |
| KR | 10-2005-0111764 | 11/2005 |
| KR | 10-0578877 | 5/2006 |
| KR | 10-2007-0117827 A | 12/2007 |
| KR | 10-0796953 | 1/2008 |
| KR | 10-0822013 | 4/2008 |
| KR | 10-2008-0099132 A | 11/2008 |
| KR | 10-2009-0078128 A | 7/2009 |
| WO | 99/60638 A2 | 11/1999 |
| WO | 01/35473 A1 | 5/2001 |
| WO | 01/91209 A1 | 11/2001 |
| WO | 2004/084330 A2 | 9/2004 |
| WO | 2006/025707 A1 | 3/2006 |
| WO | 2006/109930 A1 | 10/2006 |
| WO | 2006/137673 A1 | 12/2006 |
| WO | 2008/086041 A1 | 7/2008 |

OTHER PUBLICATIONS

Quantachrome Corporation, Brochure for Quantachrome Instruments Autotap device (2007).

Ho et al., "Application of A-C Techniques to the Study of Lithium Diffusion in Tungsten Trioxide Thin Films," J. Electrochem. Soc., 1980; 127:343-350.

Hwang et al. "Influence of Mn content on the morphology and electrochemical performance of $LiNi_{1-x-y}Co_xMn_yO_2$ cathode materials," J. Mater. Chem. 2003; 13:1962-1968.

Kang et al., "Enchancing the rate capability of high capacity $xLi_2MnO_3 \cdot (1-x)LiMO_2$ (M=Mn, Ni, Co) electrodes by Li—Ni—PO4 treatment," Electrochemistry Communications 11 (2009) 748-751.

Kang et al., "Layered $Li(Li_{0.2}Ni_{0.15+0.5z}Co_{0.10}Mn_{0.55-0.5z})O_{2-z}F_z$ cathode materials for Li-ion secondary batteries," Journal of Power Sources 146 (2005) 654-657.

Kim et al., "Synthesis of spherical $Li[Ni_{(1/3-z)}Co_{(1/3-z)}Mn_{(1/3-z)}Mg_z]O_2$ as positive electrode material for lithium ion battery," Electrchimica Acta 51 (2006) 2447-2453.

(56) References Cited

OTHER PUBLICATIONS

Kim et al., "Improvement of High-Voltage Cycling Behavior of Surface Modified Li[Ni1/3Co1/3Mn1/3]O2 Cathodes by Fluorine Substitution for Li-Ion Batteries," Journal of the Electrochemical Society 152 (9) A1701-A1713 (2005).

Lee et al., "High capacity Li[Li0.2Ni0.2Mn0.6]O2 cathode materials via a carbonate co-precipitation method," J. of Power Sources, 162 (2006), 1346-1350.

Luo et al."On the incorporation of fluorine into the manganese spinel cathode lattice," Solid State Ionics 180 (2009) 703-707.

Song et al., "Two- and three-electrode impdeance spectroscopy of lithium-ion batteries," J. of Power Sources, 2002; 111:255-267.

Sun et al., "AlF3-Coating to Improve High Voltage Cycling Performance of Li[Ni1/3Co1/3Mn1/3]O2 Cathode Materials for Lithium Secondary Batteries," J. of the Electrochemical Society, 154 (3), A168-A172 (2007).

Sun et al, "Significant Improvement of high voltage cycling behavior AlF3-coated LiCoO2 cathode," Electrochemistry Communications 8 (2006) 821-826.

Thackeray et al., "Li2MnO3-stabilized LiMO2 (M=Mn, Ni, Co) electrodes for lithium-ion batteries," J. Mater. Chem., 2007; 17:3112-3125.

Thackeray et al., "Comments on the structural complexity of lithium-rich Li1+xM1-xO2 electrodes (M=Mn,Ni,Co) for lithium batteries," Electrochemistry Communications 8 (2006), 1531-1538.

Woo et al., "Significant Improvement of Electrochemical Performance of AlF3-Coated Li[Ni0.8Co0.1Mn0.1]O2 Cathode Materials," J. of the Electrochemical Society, 154 (11) A1005-A1009 (2007).

Wu et al., "High Capacity, Surface-Modified Layered Li[Li(1-x)/3Mn(2-x)/3Nix/3Cox/3]O2 Cathodes with Low Irreversible Capacity Loss," Electrochemical and Solid State Letters, 9 (5) A221-A224 (2006).

Armstrong et al., "Demonstrating Oxygen Loss and Associated Structural Reorganization in the Lithium Battery Cathode Li[NiLiMn]O," J. Am. Chem. Soc., 2006, 128 (26), 8694-8698.

Aurbach et al. "Studies of cycling behavior, ageing, and interfacial reactions of LiNi0.5Mn1.5O4 and carbon electrodes for lithium-ion 5-V cells," J. of Power Sources 162 (2006) 780-789.

Aurbach et al., "On the capacity fading of LiCoO2 intercalation electrodes: the effect of cycling, storage, temperature, and surface film forming additives," Electrochimica Acta 47 (2002) 4291-4306.

Chen et al., "Studies of LiCoO2 Coated with Metal Oxides," Electrochemical and Solid State Letters, 6 (11) A221-A224 (2003).

Chen et al., "Effect of a ZrO2 Coating on the Structure and Electrochemistry of LixCoO2 When Cycled to 4.5 V," Electrochemical and Solid-State Letters, 5 (10) A213-A216 (2002).

Cho et al., "Comparison of Al2O3- and AlPO4-coated LiCoO2 cathode materials for a Li-ion cell," J. of Power Sources 146 (2005) 58-64.

Cho et al., "LiCoO2 Cathode Material That Does Not Show a Phase Transition from Hexagonal to Monoclinic Phase," J. of the Electrochemical Society, 148 (10) A1110-A1115 (2001).

Cho et al., "High-Performance ZrO2-Coated LiNiO2 Cathode Material," Electrochemical and Solid-State Letters, 4 (10) A159-A161 (2001).

Cho et al., "Zero-Strain Intercalation Cathode for Rechargeable Li-Ion Cell," Angew. Chem. Int. Ed. 2001, 40 (18): 3367-3369.

Cho et al., "Novel LiCoO2 Cathode Material with Al2O3 Coating for a Li Ion Cell," Chem. Mater. 2000, 12 (12), 3788-3791.

Choi et al., "Superior Capacity Retention Spinel Oxyfluoride Cathodes for Lithium-Ion Batteries," Electrochemical and Solid-State Letters 9 (5) (2006) A245-A248.

Fey et al., "Enhanced cyclability of LiCoO2 cathodes coated with alumina derived from carboxylate-alumoxanes," J. of Applied Electrochemistry (2005) 35:177-184.

Fey et al., "Preformed boehmite nanoparticles as coating materials for long-cycling LiCoO2," J. of Applied Electrochemistry 34:715-722 (2004).

Fey et al., "A simple mechano-thermal coating process for improved lithium battery cathode materials," J. of Power Sources 132 (2004) 172-180.

Fey et al., "Saturated linear dicarboxylic acids as chelating agents for the sol-gel synthesis of LiNi0.8Co0.2O2," Materials Chemistry and Physics 87 (2004) 246-255.

Ito et al., "The relationship between crystal structure and the electrochemical reaction of Li-rich insertion materials (2)" 2010. (English abstract).

Johnson et al. "The significance of the Li2MnO3 component in 'composite' xLi2MnO3 • (1-x)LiMn0.5Ni0.5O2 electrodes," Electrochemistry Communications 6 (2004) 1085-1091.

Kim et al., "Remarkable improvement in cell safety for Li[Ni0.5Co0.2Mn0.3]O2 coated with LiFePO4," Journal of Alloys and Compounds 492 (2010) L87-L90.

Kim et al., "Electrochemical and Structural Properties of xLi2M'O3•(1-x)LiMn0.5Ni0.5O2 Electrodes for Lithium Batteries (M'=Ti, Mn, Zr; 0 ≤x≤ 0.3)" Chem. Mater. 2004, 16, 1996-2006.

Kim et al., "Electrochemical Stability of Thin-Film LiCoO2 Cathodes by Aluminum-Oxide Coating," Chem. Mater. 2003, 15(7):1505-1511.

Lee et al., "Electrochemical characteristics of Al2O3-coated lithium manganese spinel as a cathode material for a lithium secondary battery," J. of Power Sources 126 (2004) 150-155.

Myung et al., "Effect of AlF3 Coating on Thermal Behavior of Chemically Delithiated Li0.35[Ni1/3Co1/3Mn1/3]O2," J Phys. Chem. C, 114 (10): 4710-4718 (2010).

Okumura et al., "Cathode having high rate performance for a secondary Li-ion cell surface-modified by aluminum oxide nanoparticles," J. of Power Sources 189 (2009) 471-475.

Ohsawa et al., "The relationship between crystal structure and the electrochemical reaction of Li-rich insertion materials (1)," 2010. (English abstract).

Park et al., "Lithium-manganese-nickel-oxide electrodes with integrated layered-spinel structures for lithium batteries," Electrochemistry Communications 9 (2007) 262-268.

Sun et al., "The preparation and electrochemical performance of solid solutions LiCoO2—Li2MnO3 as cathode materials for lithium ion batteries," J of Power Sources 159 (2006) 1353-1359.

Thackeray et al., "Advances in manganese-oxide 'composite' electrodes for lithium-ion batteries," J. Mater. Chem., 2005,15, 2257-2267.

Yabuuchi et al., "Study of LiMnO3—Li(Co1/3Ni1/3Mn1/3)O2 for High Capacity Positive Electrode Material: II. Redox Reaction at the Positive Electrode/Electrolyte Interface," 2010. (English abstract).

Yoshii et al., "Study of LiMnO3—Li(Co1/3Ni1/3Mn1/3)O2 for High Capacity Positive Electrode Material: I. Change in the Crystal and Electronic Structure upon Li de-intercalation," 2010. (English abstract).

Zheng et al., "The Effects of AlF3 Coating on the Performance of Li[Li0.2Mn0.54Ni0.13Co0.13]O2 Positive Electrode Material for Lithium-Ion Battery," Journal of the Electrochemical Society, 155 (10)A775-A782 (2008).

Boulineau et al., "Reinvestigation of Li2MnO3 Structure: Electron Diffraction and High Resolution TEM," Chem. Mater. 2009, 21, 4216-4222.

Hong et al., "Structural evolution of layered Li1.2Ni0.2Mn0.6O2 upon electrochemical cycling in a Li rechargeable battery," J. Mater. Chem., 2010, 20, 10179-10186.

Johnson et al., "Lithium-manganese oxide electrodes with layered-spinel composite structures xLi2MnO3 • (1-x)Li1+yMn2-yO4 (0<x<1, 0≤y≤0.33) for lithium batteries," Electrochemistry Communications 7 (2005) 528-536.

Kang et al., "The Effects of Acid Treatment on the Electrochemical Properties of 0.5 Li2MnO3•0.5 LiNi0.44Co0.25Mn0.31O2 Electrodes in Lithium Cells," Journal of the Electrochemical Society 153(6):A1186-A1192 (2006).

Park et al., "Physical and electrochemical properties of spherical Li1+x(Ni1/3Co1/3Mn1/3)1-xO2 cathode materials", Journal of Power Sources, 177:177-183 (2008).

Robertson et al., "Mechanism of Electrochemical Activity in Li2MnO3," Chem. Mater. 2003, 15, 1984-1992.

(56) References Cited

OTHER PUBLICATIONS

Yabuuchi et al., "Detailed Studies of a High-Capacity Electrode Material for Rechargeable Batteries, Li2MnO3—LiCo1/3Ni1/3Mn1/3O2," J. Am. Chem. Soc. 2011, 133, 4404-4419.

Search Report and Written Opinion for International Patent Application No. PCT/US2011/028951, dated Nov. 28, 2011.

Ito et al., "Cyclic deterioration and it's improvement for Li-rich layered cathode material Li [Ni0.17Li0.2Co0.07Mn0.56]O2," Journal of Power Sources, 195: 567-573 (2010).

Ito et al., "A new approach to improve the high-voltage cyclic performance of Li-rich layered cathode material by electrochemical pretreatment," Journal of Power Sources 183: 344-346 (2008).

Jiang et. al. "Structure, Electrochemical Properties, and Thermal Stability Studies of Cathode Materials in the xLi [Mn1/2Ni1/2]O2•yLiCoO2•zLi[Li1/3Mn2/3]O2 Pseudoternary System (x+y+z=1)," Journal of the Electrochemical Society, 152(9): A1879-A1889 (2005).

Shin et al., "Synthesis and electrochemical properties of Li[Li(1-2x)/3NixMn(2-x)/3]O2 as cathode materials for lithium secondary batteries," Journal of Power Sources 112: 634-638 (2002).

European Search Report for co-pending application EP11763220 dated Mar. 11, 2014 (7 pages).

(2007) Liu et al., "Effect of electrolyte additives in improving the cycle and calendar life of graphite/Li.1 [Ni1/3Co1/3Mn1/3]0.9O2 Li-ion cells," Journal of Power Sources 174: 852-855 (2007).

\* cited by examiner

Fig. 7

Fig. 14
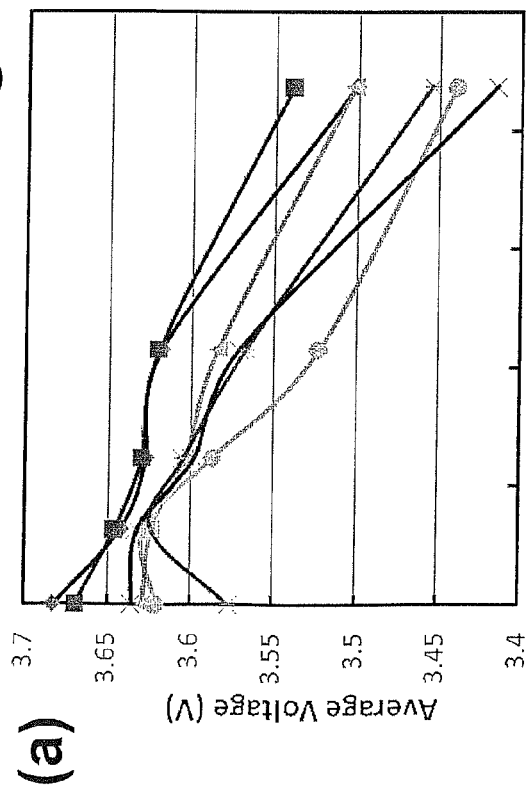
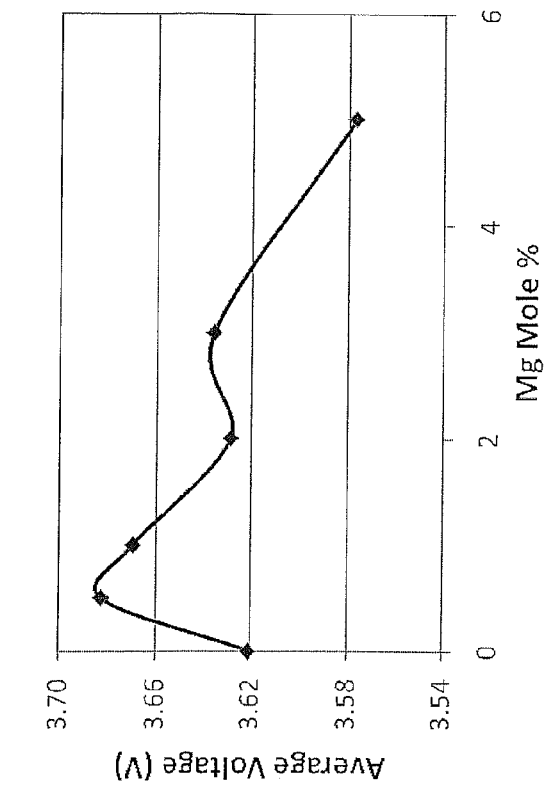

Fig. 16
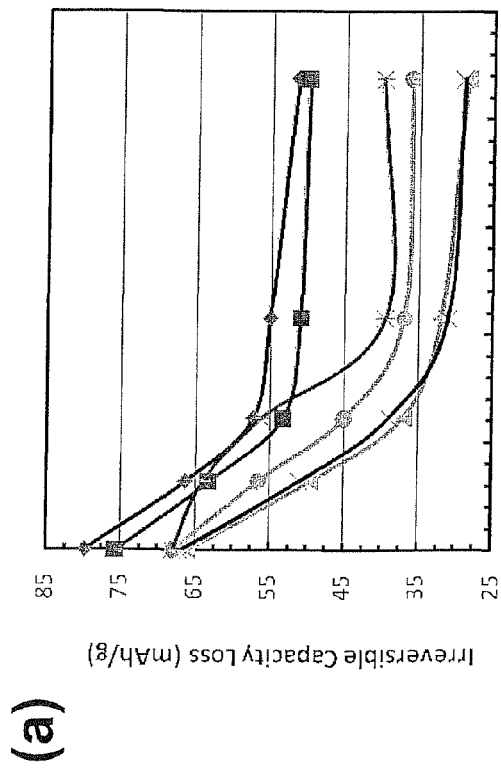
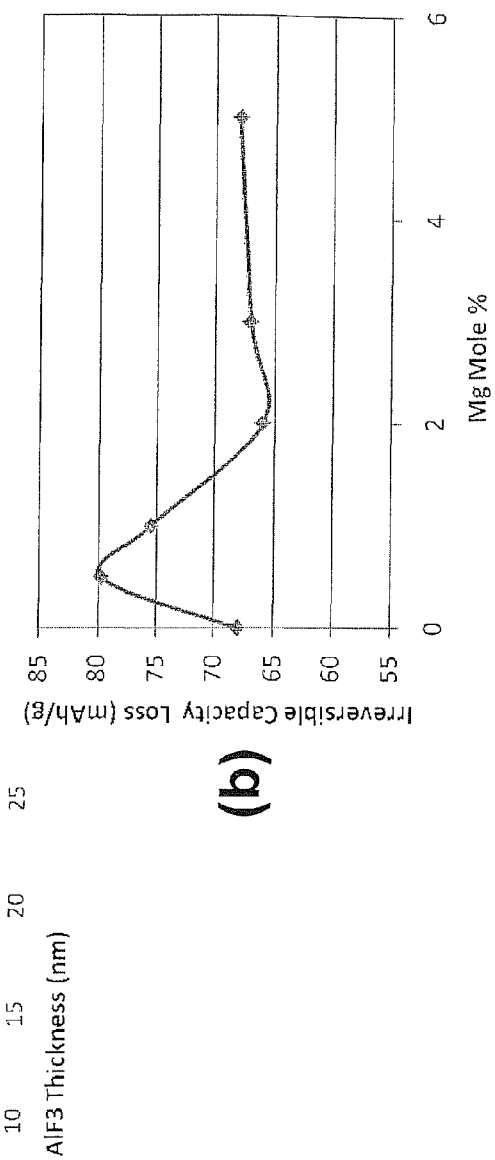

DOPED POSITIVE ELECTRODE ACTIVE MATERIALS AND LITHIUM ION SECONDARY BATTERY CONSTRUCTED THEREFROM

FIELD OF THE INVENTION

The invention relates to doped positive electrode compositions and method of making the compositions. In general, the doped positive electrode materials and compositions have high specific capacity. Furthermore, the invention relates to lithium secondary batteries constructed from the doped positive electrode active material that provide high specific discharge capacities and long cycling lives.

BACKGROUND OF THE INVENTION

Lithium batteries are widely used in consumer electronics due to their relatively high energy density. Rechargeable batteries are also referred to as secondary batteries, and lithium ion secondary batteries generally have a negative electrode material that incorporates lithium when the battery is charged. For some current commercial batteries, the negative electrode material can be graphite, and the positive electrode material can comprise lithium cobalt oxide ($LiCoO_2$). In practice, only a modest fraction of the theoretical capacity of the cathode generally can be used. At least two other lithium-based cathode materials are also currently in commercial use. These two materials are $LiMn_2O_4$, having a spinel structure, and $LiFePO_4$, having an olivine structure. These other materials have not provided any significant improvements in energy density.

Lithium ion batteries are generally classified into two categories based on their application. The first category involves high power battery, whereby lithium ion battery cells are designed to deliver high current (Amperes) for such applications as power tools and Hybrid Electric Vehicles (HEVs). However, by design, these battery cells are lower in energy since a design providing for high current generally reduces total energy that can be delivered from the battery. The second design category involves high energy batteries, whereby lithium ion battery cells are designed to deliver low to moderate current (Amperes) for such applications as cellular phones, lap-top computers, Electric Vehicles (EVs) and Plug in Hybrid Electric Vehicles (PHEVs) with the delivery of higher total capacity.

SUMMARY OF THE INVENTION

In one aspect, the invention pertains to a positive electrode active material comprising a composition with a formula $Li_{1+x}Ni_\alpha Mn_\beta{-\delta}Co_\gamma A_\delta X_\mu O_{2-z}F_z$, in which x ranges from about 0.01 to about 0.3, $\alpha$ ranges from about 0.1 to about 0.4, $\beta$ ranges from about 0.25 to about 0.65, $\gamma$ ranges from about 0 to about 0.4, $\delta$ ranges from about 0.001 to about 0.15, $\mu$ ranges from 0 to about 0.1, and z ranges from 0 to about 0.2. A can be Mg, Ca, Sr, Ba, Zn, Cd, or combinations thereof, and X is a transition metal distinct from A, Ni, Mn and Co.

In a further aspect, the invention pertains to a positive electrode active material for a lithium ion battery having an average discharge voltage of at least about 3.63 volts at a discharge rate of C/10, a 10th cycle discharge capacity of at least about 240 mAh/g at room temperature at a discharge rate of C/3 when discharged from 4.6 volts to 2.0 volts, and a 40th cycle discharge capacity at least about 90% of the 10th cycle discharge capacity when cycled between the 10th cycle and the 40th cycle at room temperature at a discharge rate of C/3 and from 4.6 volts to 2.0 volts.

In another aspect, the invention pertains to a method for the synthesis of a layered lithium metal oxide composition comprising precipitating a mixed metal hydroxide or carbonate composition from a solution comprising +2 metal cations, wherein the mixed metal hydroxide or carbonate composition has a selected stoichiometry comprising $Ni^{+2}$, $Mn^{+2}$, $Co^{+2}$ with a dopant concentration from about 0.1 to about 10 mole percent wherein the dopant comprises Mg, Ca, Sr, Ba, Zn, Cd or a combination thereof.

In additional aspects, the invention pertains to a positive electrode active material for a lithium ion battery having an average discharge voltage of at least about 3.63 volts at a discharge rate of C/10, a 10th cycle discharge capacity of at least about 240 mAh/g at room temperature at a discharge rate of C/3 when discharged from 4.6 volts to 2.0 volts, and a 46th cycle discharge capacity at least about 170 mAh/g at room temperature at a discharge rate of 2C and from 4.6 volts to 2.0 volts.

BRIEF DESCRIPTION OF THE DRAWINGS

Figure 7:
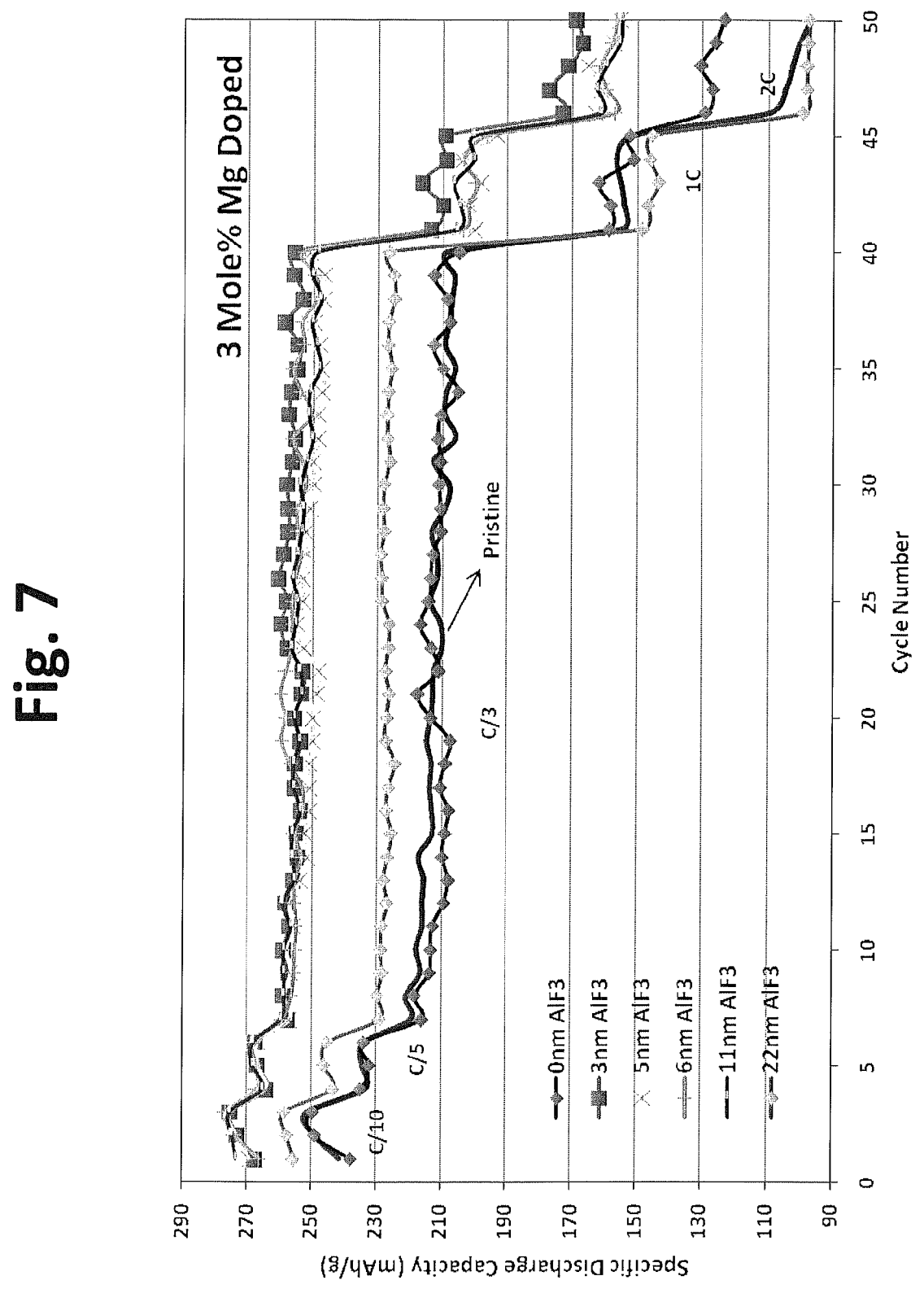

FIG. 7 is a graph with plots of specific discharge capacity versus cycle number of batteries formed with positive electroactive materials containing 3.0 mole percent Mg with 0, 3, 5, 6, 11, and 22 nm $AlF_3$ coating composition. A sample with no Mg doping and no $AlF_3$ coating is included as a control.

FIG. 14a is a graph with plots of first discharge cycle average voltage versus thickness of AlF$_3$ coating with 0, 0.5, 1, 2, 3, and 5 mole % Mg doping FIG. 14b is a plot of first discharge cycle average voltage versus mole percentage of Mg of uncoated composition.

FIG. 16a is a graph with plots of first cycle irreversible capacity loss versus thickness of AlF$_3$ coating with 0, 0.5, 1, 2, 3, and 5 mole % Mg doping.

FIG. 16b is a plot of first cycle irreversible capacity loss versus mole percentage of Mg of uncoated composition.

DETAILED DESCRIPTION OF THE INVENTIONS

Figure 1:
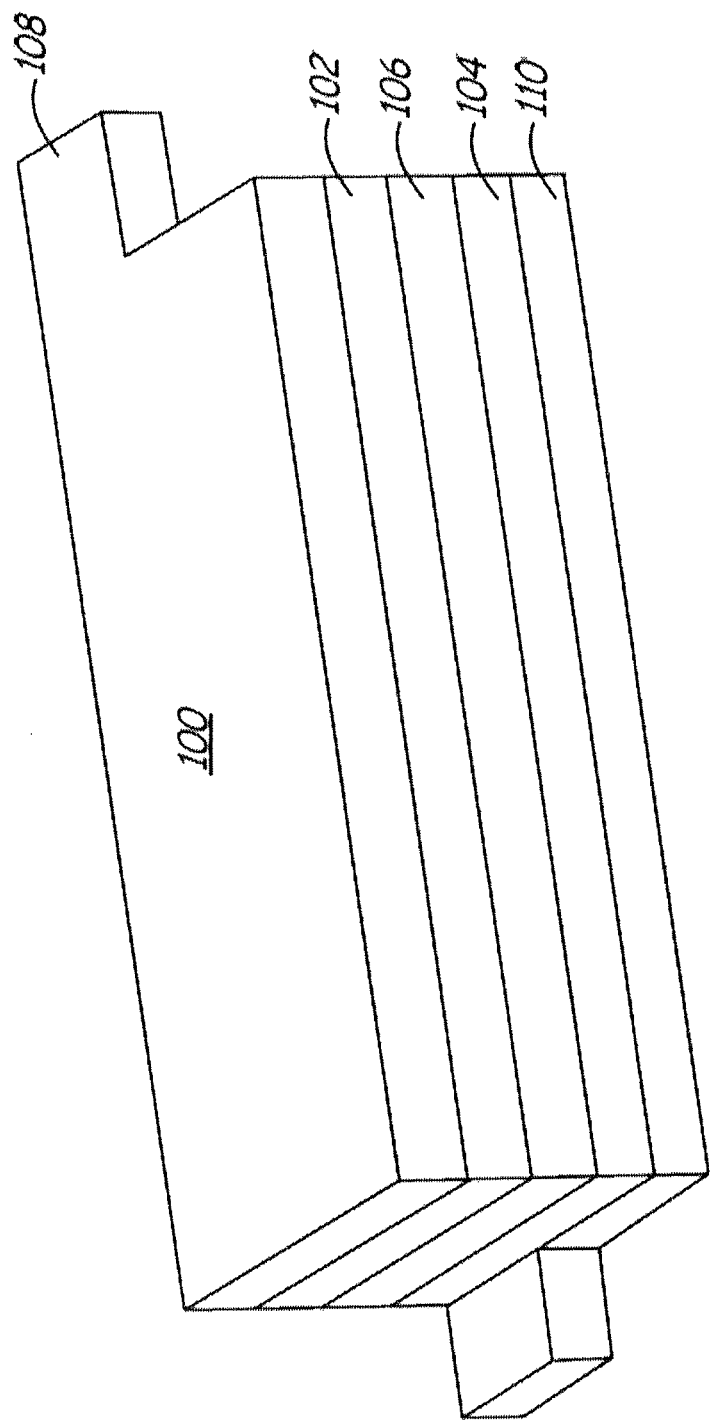
FIG. 1 is a schematic drawing of a battery structure separated from a container.

Doped lithium-rich lithium metal oxide compositions are presented as more stable positive electrode active compositions for high voltage cycling of lithium ion batteries. In particular, the doping can yield desirable performance for lithium rich compositions that are represented by the formula $Li_{1+x}M_{1-x-y}A_yO_{2-z}F_z$, where M generally is a combination of metals generally including manganese (Mn) and A is a dopant metal, generally having a +2 oxidation state. The fluorine is an optional anion dopant. High specific capacity doped positive electrode materials for lithium ion secondary batteries can be produced using processes that yield improved energy performance and that are scalable for commercial production. Suitable synthesis processes include, for example, co-precipitation approaches. In some embodiments, the dopant element A can be included as part of the metal salts in a solution phase prior to precipitating metal carbonate or hydroxide for further processing. The stoichiometries of the dopant in the active material of particular interest provide desirable properties for the positive electrode material in commercial applications. The materials have excellent cycling properties and overall capacity as a result of a relatively high tap density combined with a high specific capacity. The materials additionally can have high average voltage, lower impedance and low first cycle irreversible capacity loss. Use of a metal fluoride coating or other suitable coatings provides further cycling enhancement.

The positive electrode materials described herein can be used to construct batteries that have combination of excellent cycling performance, high specific capacity, high overall capacity, high average voltage, improved rate, and low impedance. The resulting lithium ion batteries can be used as an improved power source, particularly for high energy applications, such as electric vehicles, plug in hybrid vehicles and the like. The positive electrode materials exhibit a high average voltage over a discharge cycle so that the batteries have high power output along with a high specific capacity. As a result of the high tap density and excellent cycling performance, the battery exhibit continuing high total capacity when cycled. Furthermore, the positive electrode materials demonstrate a reduced proportion of irreversible capacity loss after the first charge and discharge of the battery so that negative electrode material can be correspondingly reduced if desired.

The batteries described herein are lithium ion batteries in which a non-aqueous electrolyte solution comprises lithium ions. For secondary lithium ion batteries, lithium ions are released from the negative electrode during discharge such that the negative electrode functions as an anode. Also, during discharge, oxidation of lithium at the negative electrode results in the generation of electrons. Correspondingly, the positive electrode takes up lithium ions through intercalation or a similar process during discharge such that the positive electrode functions as a cathode which consumes electrons during discharge. Upon recharging of the secondary battery, the flow of lithium ions is reversed through the battery with the negative electrode taking up lithium and with the positive electrode releasing lithium as lithium ions.

The word "element" is used herein in its conventional way as referring to a member of the periodic table in which the element has the appropriate oxidation state if the element is in a composition and in which the element is in its elemental form, $M^0$, only when stated to be in an elemental form. Therefore, a metal element generally is only in a metallic state in its elemental form or a corresponding alloy of the metal's elemental form. In other words, a metal oxide or other metal composition, other than metal alloys, generally is not metallic.

The lithium ion batteries can use a positive electrode active material that is lithium rich relative to a reference homogenous electroactive lithium metal oxide composition. While not wanted to be limited by theory, in some embodiments it is believed that appropriately formed lithium-rich lithium metal oxides have a composite crystal structure. For example, in some embodiments of lithium rich materials, a $Li_2MO_3$ material may be structurally integrated with either a layered LiM'O$_2$ component, in which a reference structure has M and M' being manganese, although particular compositions of interest have a portion of the manganese cations substituted with other transition metal cations with appropriate oxidation states. In some embodiments, the positive electrode material can be represented in two component notation as x Li$_2$MO$_3$·(1−x)LiM'O$_2$ where M' is one or more metal cations with an average valance of +3 with at least one cation being Mn$^{+3}$ or Ni$^{+3}$ and where M is one or more metal cations with an average valance of +4. These compositions are described further, for example, in U.S. Pat. No. 6,680,143 (the '143 patent) to Thackeray et al., entitled "Lithium Metal Oxide Electrodes for Lithium Cells and Batteries," incorporated herein by reference.

Positive electrode active materials of particular interest can be approximately represented with a formula $Li_{1+x}Ni_\alpha Mn_{\beta-\delta}Co_\gamma A_\delta X_\mu O_{2-z}F_z$, where x ranges from about 0.01 to about 0.3, α ranges from about 0.1 to about 0.4, β range from about 0.25 to about 0.65, γ ranges from about 0 to about 0.4, δ ranges from about 0.001 to about 0.15, μ ranges from 0 to about 0.1 an z ranges from 0 to about 0.2, and where A is Mg, Ca, Sr, Ba, Zn, Cd, or combinations thereof and X is a transition metal different from A, Ni, Mn and Co or combination thereof. X and F are optional dopants. Similar but more general compositions have been described in U.S. application Ser. No. 12/246,814 (the '814 application) to Venkatachalam et al. entitled "Positive Electrode Material for Lithium Ion Batteries Having a High Specific Discharge Capacity and Processes for the Synthesis of these Materials", and U.S. application Ser. No. 12/332,735 (the '735 application) to Lopez et al. entitled "Positive Electrode Materials for High Discharge Capacity Lithium Ion Batteries", both incorporated herein by reference. As described in the '814 application and the '735 application, surprisingly good performances have been obtained for $Li[Li_{0.2}Ni_{0.175}Co_{0.10}Mn_{0.525}]O_2$ using a co-precipitation synthesis process. As described herein, desirable properties have been obtained where a portion of the non-extractable redox active metals are replaced by non-extractable, stable +2 valence metal ions as a dopant. The dopant element does not substantially change the crystal structure relative to a reference composition in which the amount of manganese is increased to replace stoichiometrically the amount of dopant to keep the metal content equal.

The formulas presented herein are based on the molar quantities of starting materials in the synthesis, which can be accurately determined. With respect to the multiple metal cations, these are generally believed to be quantitatively incorporated into the final material with no known significant pathway resulting in the loss of the metals from the product compositions. Of course, many of the metals have multiple oxidation states, which are related to their activity with respect to the batteries. Due to the presence of the multiple oxidation states and multiple metals, the precise stoichiometry with respect to oxygen can only be roughly estimated, as is conventional in the art. However, based on the crystal structure, the overall stoichiometry with respect to the oxygen is reasonably estimated. All of the protocols discussed in this paragraph and related issues herein are routine in the art and are the long established approaches with respect to these issues in the field.

It has reported that substituting a fraction of Mn or Co with dopant metals can lead to materials with desirable properties. See, published U.S. Application No. 2007/0111098A to Sun et al., entitled "Cathode Active Material for Lithium Secondary Battery, Process for Preparing the Same and Reactor for Use in the Same Process," incorporated herein by reference. The doped materials in the '098 application are referenced to lithium cobalt oxide. The exemplified compositions in the '098 application lack lithium enrichment relative to $LiMO_2$ and have low capacities relative to the compositions described herein.

With respect to the +2 metal dopant, magnesium can be particularly desirable due to its particular oxidation potentials and reasonable cost. In some embodiments, the sum $x+\alpha+\beta+\gamma+\delta+\mu$ of the positive electrode active material $Li_{1+x}Ni_{\alpha}Mn_{\beta-\delta}Co_{\gamma}A_{\delta}X_{\mu}O_{2-z}F_z$, approximately equals 1.0. A can be considered a dopant within the crystalline material, and the material generally has mole percentage of A from about 0.1 to about 10%. With this stoichiometry, the material may form a layer-layer composite crystal structure corresponding to two materials represented by $b\,Li_2MO_3 \cdot (1-b)LiM'O_2$ where M' is one or more metal cations with an average valance of +3 with at least one cation being Mn or Ni and where M is one or more metal cations with an average valance of +4. The general compositions are described further, for example, in U.S. Pat. No. 6,680,143 to Thackeray et al., entitled "Lithium Metal Oxide Electrodes for Lithium Cells and Batteries," incorporated herein by reference. The fluorine is an optional anion dopant that substitutes for oxygen.

In the materials of particular interest, lithium is an extractable metal when the material is incorporated into a positive electrode. In particular, when the battery is charged, a significant fraction of the lithium can be extracted from the material as lithium is correspondingly taken up by the active material in the negative electrode. In the materials of particular interest, the dopant elements have stable +2 oxidation states, and the elements are members of Group IIA (column 2) or Group IIB (column 12) of the period table. It has been discovered that the use of these dopants in the high voltage, lithium rich compositions described herein provide stability for the material that results in a high capacity, improved high voltage cycling, improved rate capability and a low impedance while maintaining a relatively stable average voltage.

These compositions disclosed herein have a low risk of fire for improved safety properties due to their specific compositions with a layered structure and, in some embodiments, reduced amounts of nickel relative to some other high capacity cathode materials. In some embodiments, the compositions use low amounts of elements that are less desirable from an environmental perspective, and can be produced from starting materials that have reasonable cost for commercial scale production.

Carbonate and hydroxide co-precipitation processes have been performed for the desired lithium rich metal oxide materials described herein having a +2 valance dopant, such as magnesium, in the composition and exhibiting the high specific capacity performance. As described herein, improved compositions can be obtained using co-precipitation approaches with a hydroxide or carbonate intermediate composition, and generally a solution is formed from which a metal hydroxide or carbonate is precipitated with the desired metal stoichiometry. The metal hydroxide or carbonate compositions from co-precipitation can be subsequently heat-treated to form the corresponding metal oxide composition with appropriate crystallinity. The lithium cations can either be incorporated into the initial co-precipitation process, or the lithium can be introduced in a solid state reaction during or following the heat treatment to form the oxide compositions from the hydroxide or carbonate compositions. As demonstrated in the examples below, the resulting lithium rich metal oxide materials formed with the co-precipitation process have improved performance properties.

When the corresponding batteries with the intercalation-based positive electrode active materials are in use, the intercalation and release of lithium ions from the lattice induces changes in the crystalline lattice of the electroactive material. As long as these changes are essentially reversible, the capacity of the material does not significantly change. Generally, the capacity of active materials used in lithium ion secondary batteries is observed to decrease with longer term cycling to varying degrees. Thus, after a number of cycles, the performance of the battery falls below acceptable values, and the battery is replaced. Also, on the first cycle of the battery, generally there is an irreversible capacity loss that is significantly greater than per cycle capacity loss at subsequent cycles. The irreversible capacity loss is the difference between the charge capacity of the new battery and the first discharge capacity. To compensate for this first cycle irreversible capacity loss, extra electroactive material is included in the negative electrode such that the battery can be fully charged even though this lost capacity is not accessible during most of the life of the battery so that negative electrode material can be essentially wasted. A significant portion of the first cycle irreversible capacity loss can be attributed to the positive electrode material.

The doped positive electrode active material disclosed herein exhibit improved capacity, cycling properties, rate capability and the first cycle irreversible capacity loss. Additionally, appropriate coating materials can be used to both improve the battery capacity, long term cycling performance of the material as well as further decrease the first cycle irreversible capacity loss. While not wanting to be limited by theory, the coatings may stabilize the crystal lattice during the uptake and release of lithium ions so that irreversible changes in the crystal lattice are reduced significantly. In particular, metal fluoride compositions can be used as effective coatings. The general use of metal fluoride compositions as coatings for cathode active materials, specifically $LiCoO_2$ and $LiMn_2O_4$, is described in published PCT application WO 2006/109930A to Sun et al., entitled "Cathode Active Material Coated with Fluorine Compound for Lithium Secondary Batteries and Method for Preparing the Same," incorporated herein by reference. Improved fluoride coatings are described in copending U.S. patent application Ser. No. 12/616,226 filed on Nov. 11, 2009 to Venkatachalam et al., entitled "Coated Positive Electrode Materials for Lithium Ion Batteries," incorporated herein by reference.

It has been discovered that metal fluoride coatings can provide significant improvements for lithium rich layered positive electrode active materials described herein. These improvements relate to long term cycling with significantly reduced degradation of capacity, a significant decrease in first cycle irreversible capacity loss and an improvement in the capacity generally. The thickness of coating material can be selected to accentuate the observed performance improvements.

As described herein, the lithium rich positive electrode active materials with the composite crystal structure and appropriate coating can exhibit large specific capacities as well as large tap densities. In general, when specific capacities are comparable, a higher tap density of a positive electrode material results in a higher overall capacity of a battery. A positive electrode material described herein with high tap density in addition to high specific capacity therefore can be used to construct batteries with significantly improved performance. It is important to note that during charge/discharge measurements, the specific capacity of a material depends on the rate of discharge. The maximum specific capacity of a particular material is measured at very slow discharge rates. In actual use, the actual specific capacity is less than the maximum due to discharge at a finite rate. More realistic specific capacities can be measured using reasonable rates of discharge that are more similar to the rates during use. For low to moderate rate applications, a reasonable testing rate involves a discharge of the battery over three hours. In conventional notation this is written as C/3 or 0.33C. The positive electrode active materials described herein can have a specific discharge capacity of at least about 240 mAh/g at a discharge rate of C/3 at room temperature when discharged from 4.6 volts and tap density above 1.8 g/mL.

Rechargeable batteries have a range of uses, such as mobile communication devices, such as phones, mobile entertainment devices, such as MP3 players and televisions, portable computers, combinations of these devices that are finding wide use, as well as transportation devices, such as automobiles and fork lifts. Most of the batteries used in these electronic devices have a fixed volume. It is therefore highly desirable that the positive electrode material used in these batteries has a high tap density so there is essentially more chargeable material in the positive electrode yielding a higher total capacity of the battery. The batteries described herein that incorporate improved positive electrode active materials with respect to specific capacity, tap density, and cycling can provide improved performance for consumers, especially for medium current applications.

Battery Structure

Referring to FIG. 1, a battery 100 is shown schematically having a negative electrode 102, a positive electrode 104 and a separator 106 between negative electrode 102 and positive electrode 104. A battery can comprise multiple positive electrodes and multiple negative electrodes, such as in a stack, with appropriately placed separators. Electrolyte in contact with the electrodes provides ionic conductivity through the separator between electrodes of opposite polarity. A battery generally comprises current collectors 108, 110 associated respectively with negative electrode 102 and positive electrode 104.

Lithium has been used in both primary and secondary batteries. An attractive feature of lithium metal is its light weight and the fact that it is the most electropositive metal, and aspects of these features can be advantageously captured in lithium ion batteries also. Certain forms of metals, metal oxides, and carbon materials are known to incorporate lithium ions into its structure through intercalation, alloying or similar mechanisms. Desirable mixed metal oxides are described further herein to function as electroactive materials for positive electrodes in secondary lithium ion batteries. Lithium ion batteries refer to batteries in which the negative electrode active material is a material that takes up lithium during charging and releases lithium during discharging. If lithium metal itself is used as the anode, the resulting battery generally is simply referred to as a lithium battery.

The nature of the negative electrode intercalation material influences the resulting voltage of the battery since the voltage is the difference between the half cell potentials at the cathode and anode. Suitable negative electrode lithium intercalation compositions can include, for example, graphite, synthetic graphite, coke, fullerenes, niobium pentoxide, tin alloys, silicon, titanium oxide, tin oxide, and lithium titanium oxide, such as $Li_xTiO_2$, $0.5<<x\leq1$ or $Li_{1+x}Ti_{2-x}O_4$, $0\leq x\leq 1/3$. Additional negative electrode materials are described in copending patent application Ser. No. 12/502,609 to Kumar, entitled "Composite Compositions, Negative Electrodes with Composite Compositions and Corresponding Batteries," and Ser. No. 12/429,438 to Kumar et al., entitled "Lithium Ion Batteries with Particular Negative Electrode Compositions," both of which are incorporated herein by reference.

The positive electrode active compositions and negative electrode active compositions generally are powder compositions that are held together in the corresponding electrode with a polymer binder. The binder provides ionic conductivity to the active particles when in contact with the electrolyte. Suitable polymer binders include, for example, polyvinylidene fluoride, polyethylene oxide, polyethylene, polypropylene, polytetrafluoroethylene, polyacrylates, rubbers, e.g. ethylene-propylene-diene monomer (EPDM) rubber or styrene butadiene rubber (SBR), copolymers thereof, or mixtures thereof. The particle loading in the binder can be large, such as greater than about 80 weight percent. To form the electrode, the powders can be blended with the polymer in a suitable liquid, such as a solvent for the polymer. The resulting paste can be pressed into the electrode structure. In some embodiments, it may be advantageous to use polymer binders with high molecular weight. In some embodiments, the batteries can be constructed based on the method described in copending patent application Ser. No. 12/403,521 to Buckley et al, entitled "High Energy Lithium Ion Secondary Batteries", incorporated herein by reference.

The positive electrode composition, and possibly the negative electrode composition, generally also comprises an electrically conductive powder distinct from the electroactive composition. Suitable supplemental electrically conductive powders include, for example, graphite, carbon black, metal powders, such as silver powders, metal fibers, such as stainless steel fibers, and the like, and combinations thereof. Generally, a positive electrode can comprise from about 1 weight percent to about 25 weight percent, and in further embodiments from about 2 weight percent to about 15 weight percent distinct electrically conductive powder. A person of ordinary skill in the art will recognize that additional ranges of amounts of electrically conductive powders within the explicit ranges above are contemplated and are within the present disclosure.

The electrode generally is associated with an electrically conductive current collector to facilitate the flow of electrons between the electrode and an exterior circuit. The current collector can comprise metal, such as a metal foil or a metal grid. In some embodiments, the current collector can be formed from nickel, aluminum, stainless steel, copper or the like. The electrode material can be cast as a thin film onto the current collector. The electrode material with the current collector can then be dried, for example in an oven, to remove solvent from the electrode. In some embodiments, the dried electrode material in contact with the current collector foil or other structure can be subjected to a pressure from about 2 to about 10 kg/cm$^2$ (kilograms per square centimeter).

The separator is located between the positive electrode and the negative electrode. The separator is electrically insulating while providing for at least selected ion conduction between the two electrodes. A variety of materials can be used as separators. Commercial separator materials are generally formed from polymers, such as polyethylene and/or polypropylene that are porous sheets that provide for ionic conduction. Commercial polymer separators include, for example, the Celgard® line of separator material from Hoechst Celanese, Charlotte, N.C. Also, ceramic-polymer composite materials have been developed for separator applications. These composite separators can be stable at higher temperatures, and the composite materials can significantly reduce the fire risk. The polymer-ceramic composites for separator materials are described further in U.S. patent application 2005/0031942A to Hennige et al., entitled "Electric Separator, Method for Producing the Same and the Use Thereof," incorporated herein by reference. Polymer-ceramic composites for lithium ion battery separators are sold under the trademark Separion® by Evonik Industries, Germany.

We refer to solutions comprising solvated ions as electrolytes, and ionic compositions that dissolve to form solvated ions in appropriate liquids are referred to as electrolyte salts. Electrolytes for lithium ion batteries can comprise one or more selected lithium salts. Appropriate lithium salts generally have inert anions. Suitable lithium salts include, for example, lithium hexafluorophosphate, lithium hexafluoroarsenate, lithium bis(trifluoromethyl sulfonyl imide), lithium trifluoromethane sulfonate, lithium tris(trifluoromethyl sulfonyl)methide, lithium tetrafluoroborate, lithium perchlorate, lithium tetrachloroaluminate, lithium chloride, lithium difluoro oxalato borate, and combinations thereof. Traditionally, the electrolyte comprises a 1 M concentration of the lithium salts.

For lithium ion batteries of interest, a non-aqueous liquid is generally used to dissolve the lithium salt(s). The solvent generally does not dissolve the electroactive materials. Appropriate solvents include, for example, propylene carbonate, dimethyl carbonate, diethyl carbonate, 2-methyl tetrahydrofuran, dioxolane, tetrahydrofuran, methyl ethyl carbonate, γ-butyrolactone, dimethyl sulfoxide, acetonitrile, formamide, dimethyl formamide, triglyme (tri(ethylene glycol)dimethyl ether), diglyme (diethylene glycol dimethyl ether), DME (glyme or 1,2-dimethyloxyethane or ethylene glycol dimethyl ether), nitromethane and mixtures thereof. Particularly useful solvents for high voltage lithium-ion batteries are described further in copending U.S. patent application Ser. No. 12/630,992 filed on Dec. 4, 2009 to Amiruddin et al., entitled "Lithium Ion Battery With High Voltage Electrolytes and Additives," incorporated herein by reference.

The electrodes described herein can be incorporated into various commercial battery designs. For example, the cathode compositions can be used for prismatic shaped batteries, wound cylindrical batteries, coin batteries or other reasonable battery shapes. The testing in the Examples is performed using coin cell batteries. The batteries can comprise a single cathode structure or a plurality of cathode structures assembled in parallel and/or series electrical connection(s). While the positive electrode active materials can be used in batteries for primary, or single charge use, the resulting batteries generally have desirable cycling properties for secondary battery use over multiple cycling of the batteries.

In some embodiments, the positive electrode and negative electrode can be stacked with the separator between them, and the resulting stacked structure can be rolled into a cylindrical or prismatic configuration to form the battery structure. Appropriate electrically conductive tabs can be welded or the like to the current collectors, and the resulting jellyroll structure can be placed into a metal canister or polymer package, with the negative tab and positive tab welded to appropriate external contacts. Electrolyte is added to the canister, and the canister is sealed to complete the battery. Some presently used rechargeable commercial batteries include, for example, the cylindrical 18650 batteries (18 mm in diameter and 65 mm long) and 26700 batteries (26 mm in diameter and 70 mm long), although other battery sizes can be used.

Positive Electrode Active Materials

The positive electrode active materials comprise lithium intercalating metal oxide compositions. In some embodiments, the lithium metal oxide compositions can comprise lithium rich compositions that generally are believed to form a layered composite crystal structure. It has been found that doping with +2 valance metal ions can further stabilize and improve the performance of the resulting compositions. In some embodiments, the compositions further comprise Ni, Co and Mn ions. It has been surprisingly found that the dopant improves the performance of the resulting compositions with respect to the capacity after cycling. Furthermore, for coated samples, the average voltage can be increased with doping and some decrease in the irreversible capacity loss has also been found. The desired electrode active materials can be synthesized using synthesis approaches described herein.

In some compositions of particular interest, the compositions can be described by the formula $Li_{1+x}Ni_\alpha Mn_{\beta-\delta}Co_\gamma A_\delta X_\mu O_{2-z}F_z$, where x ranges from about 0.01 to about 0.3, α ranges from about 0.1 to about 0.4, β ranges from about 0.25 to about 0.65, γ ranges from about 0 to about 0.4, δ ranges from about 0.001 to about 0.15, μ ranges from 0 to about 0.1 and z ranges from 0 to about 0.2 and where A is Mg, Ca, Sr, Ba, Zn, Cd, or combinations thereof and X is an optional transition metal dopant or combination thereof other than A, Ni, Mn, and Co. In some embodiments, the sum x+α+β+γ+δ+μ of the positive electrode active material approximately equals 1.0. With respect to the amount of dopant A present in the composition, in further embodiments 5 ranges from about 0.0025 to about 0.12 and in other embodiments from about 0.005 to about 0.11 and in additional embodiments from about 0.01 to about 0.10. The amount of dopant A can be selected such that the crystal structure of the material is substantially unchanged relative to the crystal structure of a reference composition with the stoichiometry $Li_{1+x}Ni_\alpha Mn_\beta Co_\gamma O_{2-z}F_z$. A person of ordinary skill in the art will recognize that additional ranges of parameter values within the explicit ranges above are contemplated and are within the present disclosure. In general, it is desirable to provide an inert inorganic coating to further stabilize the materials. Coatings are described further below.

With respect to some embodiments of materials described herein, Thackeray and coworkers have proposed a composite crystal structure for some lithium rich metal oxide compositions in which a $Li_2MO_3$ composition is structurally integrated into a layered structure with a $LiM'O_2$ component. The electrode materials can be represented in two component notation as $b\ Li_2MO_3\ (1-b)\ LiM'O_2$, where M' is one or more metal elements with an average valance of +3 and with at least one element being Mn or Ni and M is a metal element with an average valance of +4 and $0<b<1$, and in some embodiments $0.03 \leq b \leq 0.9$. For example, M' can be a combination of $Ni^{+2}$, $Co^{+3}$ and $Mn^{+4}$. The overall formula for these compositions can be written as $Li_{1+b/(2+b)}M_{2b/(2+b)}M'_{(2-2b)/(2+b)}O_2$. This formula is consistent with the sum $x+\alpha+\beta+\gamma+\delta+\mu$ equal to 1 in the formula of the previous paragraph where $x=b/(2+b)$. Batteries formed from these it have been observed to cycle at higher voltages and with higher capacities relative to batteries formed with corresponding $LiMO_2$ compositions. These materials are described generally in U.S. Pat. No. 6,680,143 to Thackeray et al., entitled Lithium Metal Oxide Electrodes for Lithium Cells and Batteries," and U.S. Pat. No. 6,677,082 to Thackeray et al., entitled "Lithium Metal Oxide Electrodes for Lithium Cells and Batteries," both of which are incorporated herein by reference. Thackeray identified Mn, Ti and Zr as being of particular interest as M' and Mn and Ni for M.

The structure of some specific layered structures is described further in Thackeray et al., "Comments on the structural complexity of lithium-rich $Li_{1+x}M_{1-x}O_2$ electrodes (M=Mn, Ni, Co) for lithium batteries," Electrochemistry Communications 8 (2006), 1531-1538, incorporated herein by reference. The study reported in this article reviewed compositions with the formulas $Li_{1+x}[Mn_{0.5}Ni_{0.5}]_{1-x}O_2$ and $Li_{1+x}[Mn_{0.333}Ni_{0.333}Co_{0.333}]_{1-x}O_2$. The article also describes the structural complexity of the layered materials.

Recently, Kang and coworkers described a composition for use in secondary batteries with the formula $Li_{1+x}Ni_\alpha Mn_\beta Co_\gamma M'_\delta O_{2-z}F_z$, M'=Mg, Zn, Al, Ga, B, Zr, Ti, x between about 0 and 0.3, α between about 0.2 and 0.6, β between about 0.2 and 0.6, γ between about 0 and 0.3, δ between about 0 and 0.15 and z between about 0 and 0.2. The metal ranges and fluorine were proposed as improving battery capacity and stability of the resulting layered structure during electrochemical cycling. See U.S. Pat. No. 7,205,072, to Kang et al. (the '072 patent), entitled "Layered cathode materials for lithium ion rechargeable batteries," incorporated herein by reference. This reference reported a cathode material with a capacity below 250 mAh/g (milli-ampere hours per grain) at room temperature after 10 cycles, which is at an unspecified rate that can be assumed to be low to increase the performance value. It is noted that if fluorine is substituted for oxygen. Kang et al. examined various specific compositions including $Li_{1.2}Ni_{0.15}Mn_{0.55}Co_{0.10}O_2$, which is similar to the composition examined in the examples below except for the magnesium doping.

The results obtained in the '072 patent involved a solid state synthesis of the materials that did not achieve comparable cycling capacity of the batteries formed with cathode active materials formed with co-precipitation methods. The improved performance of the materials formed by co-precipitation is described further in the '814 application and '735 application noted above. The co-precipitation process for the doped materials described herein is described further below.

Fluorine dopants have been proposed to improve performance, as described in the '072 patent. It has been proposed that fluorine dopant incorporation is reduced or eliminated in higher temperature processing due to volatility of LiF at high reaction temperatures. See Luo et al., "On the incorporation of fluorine into the manganese spinel cathode lattice," Solid State Ionics 180 (2009) 703-707. However, it would seem that reasonable adjustment of the reaction conditions should provide for some fluorine doping through the high temperature process. The use of a fluorine dopant in lithium rich metal oxides to achieve improved performance is described in copending U.S. patent application Ser. No. 12/569,606 to Kumar et al., entitled "Fluorine Doped Lithium Rich Metal Oxide Positive Electrode Battery Materials With High Specific Capacity and Corresponding Batteries," incorporated herein by reference. Thus, fluorine dopants may provide additional benefits for compositions doped with +2 metal ions. Fluorine dopants can be introduced using, for example, $MgF_2$ during an oxide formation step or, for example, reacting $NH_4HF_2$ with the already formed oxide at a temperature on the order of 450° C.

The performance of the positive electrode active materials is influenced by many factors. With respect to the doped materials, the amount of dopant influences the resulting properties, as discussed further below. The mean particle size and the particle size distribution are two of the basic properties characterizing the positive electrode active materials, and these properties influence the rate capabilities and tap densities of the materials. Because batteries have fixed volumes, it is therefore desirable that the material used in the positive electrode of these batteries has a high tap density if the specific capacity of the material can be maintained at a desirably high value. Then, the total capacity of the battery can be higher due to the presence of more chargeable material in the positive electrode.

Synthesis Methods

Synthesis approaches described herein can be used to form doped forms of layered lithium rich cathode active materials with improved specific capacity upon cycling and a high tap density. The synthesis methods have been adapted for the synthesis of compositions with the formula $Li_{1+x}Ni_\alpha Mn_{\beta-\delta} Co_\gamma A_\delta X_\mu O_{2-z}F_z$, where x ranges from about 0.01 to about 0.3, α ranges from about 0.1 to about 0.4, β ranges from about 0.25 to about 0.65, γ ranges from about 0 to about 0.4, δ ranges from about 0.001 to about 0.15, μ ranges from 0 to about 0.1 and z ranges from 0 to about 0.2, and where A is Mg, Ca, Sr, Ba, Zn, Cd, or combinations thereof and where X is a transition metal or combination thereof other than A, Ni, Mn and Co. In some embodiments, the sum $x+\alpha+\beta+\gamma+\delta+\mu$ of the positive electrode active material approximately equals 1.0, which is set through the selection of reactants in the synthesis. The synthesis approaches are also suitable for commercial scale up. Specifically, co-precipitation process can be used to synthesize the desired lithium rich positive electrode materials with desirable results. Additionally, a solution assisted precipitation method discussed in detail below can be used to coat the material with metal fluoride.

In the co-precipitation process, metal salts are dissolved into an aqueous solvent, such as purified water, with a desired molar ratio. Suitable metal salts include, for example, metal acetates, metal sulfates, metal nitrates, and combination thereof. The concentration of the solution is generally selected between 1M and 3M. The relative molar quantities of metal salts can be selected based on the desired formula for the product materials. Similarly, the dopant elements can be introduced along with the other metal salts at the appropriate molar quantity such that the dopant is incorporated into the precipitated material. The pH of the solution can then be adjusted, such as with the addition of $Na_2CO_3$ and/or ammonium hydroxide, to precipitate a metal hydroxide or carbonate with the desired amounts of metal elements. Generally, the pH can be adjusted to a value between about 6.0 to about 12.0. The solution can be heated and stirred to facilitate the precipitation of the hydroxide or carbonate. The precipitated metal hydroxide or carbonate can then be separated from the solution, washed and dried to form a powder prior to further processing. For example, drying can be performed in an oven at about 110° C. for about 4 to about 12 hours. A person of ordinary skill in the art will recognize that additional ranges of process parameters within the explicit ranges above are contemplated and are within the present disclosure.

The collected metal hydroxide or carbonate powder can then be subjected to a heat treatment to convert the hydroxide or carbonate composition to the corresponding oxide composition with the elimination of water or carbon dioxide. A fluoride, such as $MgF_2$, can be added to introduce a fluoride dopant. Generally, the heat treatment can be performed in an oven, furnace or the like. The heat treatment can be performed in an inert atmosphere or an atmosphere with oxygen present. In some embodiments, the material can be heated to a temperature of at least about 350° C. and in some embodiments from about 400° C. to about 800° C. to convert the hydroxide or carbonate to an oxide. The heat treatment generally can be performed for at least about 15 minutes, in further embodiments from about 30 minutes to 24 hours or longer, and in additional embodiments from about 45 minutes to about 15 hours. A further heat treatment can be performed to improve the crystallinity of the product material. This calcination step for forming the crystalline product generally is performed at temperatures of at least about 650° C., and in some embodiments from about 700° C. to about 1200° C., and in further embodiments from about 700° C. to about 1100° C. The calcination step to improve the structural properties of the powder generally can be performed for at least about 15 minutes, in further embodiments from about 20 minutes to about 30 hours or longer, and in other embodiments from about 1 hour to about 36 hours. The heating steps can be combined, if desired, with appropriate ramping of the temperature to yield desired materials. A person of ordinary skill in the art will recognize that additional ranges of temperatures and times within the explicit ranges above are contemplated and are within the present disclosure.

The lithium element can be incorporated into the material at one or more selected steps in the process. For example, a lithium salt can be incorporated into the solution prior to or upon performing the precipitation step through the addition of a hydrated lithium salt. In this approach, the lithium species is incorporated into the hydroxide or carbonate material in the same way as the other metals. Also, due to the properties of lithium, the lithium element can be incorporated into the material in a solid state reaction without adversely affecting the resulting properties of the product composition. Thus, for example, an appropriate amount of lithium source generally as a powder, such as $LiOH.H_2O$, $LiOH$, $Li_2CO_3$, or a combination thereof, can be mixed with the precipitated metal carbonate or metal hydroxide. The powder mixture is then advanced through the heating step(s) to form the oxide and then the crystalline final product material.

Further details of the hydroxide co-precipitation process are described in the '814 application referenced above. Further details of the carbonate co-precipitation process are described in the '735 application referenced above.

Coatings and Methods for Forming the Coatings

Inert inorganic coatings, such as metal fluoride coatings, have been found to significantly improve the performance of the lithium rich layered positive electrode active materials described herein. In particular, the cycling properties of the batteries formed from the metal fluoride coated lithium metal oxide have been found to significantly improve from the uncoated material, although inert metal oxide coatings have also been found to yield desirable properties. Additionally, the overall capacity of the batteries also shows desirable properties with the fluoride coating, and the irreversible capacity loss of the first cycle of the battery is reduced. As discussed earlier, first cycle irreversible capacity loss of a battery is the difference between the charge capacity of the new battery and its first discharge capacity. A significant portion of the first cycle irreversible capacity loss is generally attributed to the positive electrode material. When the coating is appropriately selected, these advantageous properties from the coating are maintained for the doped compositions.

The coating provides an unexpected improvement in the performance of the high capacity lithium rich compositions described herein. In general, a selected metal fluoride or metalloid fluoride can be used for the coating. Similarly, a coating with a combination of metal and/or metalloid elements can be used. Metal/metalloid fluoride coatings have been proposed to stabilize the performance of positive electrode active materials for lithium secondary batteries. Suitable metals and metalloid elements for the fluoride coatings include, for example, Al, Bi, Ga, Ge, In, Mg, Pb, Si, Sn, Ti, Tl, Zn, Zr and combinations thereof. Aluminum fluoride can be a desirable coating material since it has a reasonable cost and is considered environmentally benign. The metal fluoride coating are described generally in published PCT application WO 2006/109930A to Sun et al., entitled "Cathode Active Materials Coated with Fluorine Compound for Lithium Secondary Batteries and Method for Preparing the Same," incorporated herein by reference. This patent application provides results for $LiCoO_2$ coated with LiF, $ZnF_2$ or $AlF_3$. The Sun PCT application referenced above specifically refers to the following fluoride compositions, CsF, KF, LiF, NaF, RbF, TiF, AgF, $AgF_2$, $BaF_2$, $CaF_2$, $CuF_2$, $CdF_2$, $FeF_2$, $HgF_2$, $Hg_2F_2$, $MnF_2$, $MgF_2$, $NiF_2$, $PbF_2$, $SnF_2$, $SrF_2$, $XeF_2$, $ZnF_2$, $AlF_3$, $BF_3$, $BiF_3$, $CeF_3$, $CrF_3$, $DyF_3$, $EuF_3$, $GaF_3$, $GdF_3$, $FeF_3$, $HoF_3$, $InF_3$, $LaF_3$, $LuF_3$, $MnF_3$, $NdF_3$, $VOF_3$, $PrF_3$, $SbF_3$, $ScF_3$, $SmF_3$, $TbF_3$, $TiF_3$, $TmF_3$, $YF_3$, $YbF_3$, $TlF_3$, $CeF_4$, $GeF_4$, $HfF_4$, $SiF_4$, $SnF_4$, $TiF_4$, $VF_4$, $ZrF_4$, $NbF_5$, $SbF_5$, $TaF_5$, $BiF_5$, $MoF_6$, $ReF_6$, $SF_6$, and $WF_6$.

The effect of an $AlF_3$ coating on the cycling performance of $LiNi_{1/3}Co_{1/3}Mn_{1/3}O_2$ is described further in an article to Sun et al., "$AlF_3$-Coating to Improve High Voltage Cycling Performance of $Li[Ni_{1/3}Co_{1/3}Mn_{1/3}]O_2$ Cathode Materials for Lithium Secondary Batteries," J. of the Electrochemical Society, 154 (3), A168-A172 (2007). Also, the effect of an $AlF_3$ coating on the cycling performance of $LiNi_{0.8}Co_{0.1}Mn_{0.1}O_2$ is described further in an article to Woo et al., "Significant Improvement of Electrochemical Performance of $AlF_3$-Coated $Li[Ni_{0.8}Co_{0.1}Mn_{0.1}]O_2$ Cathode Materials," J. of the Electrochemical Society, 154 (11) A1005-A1009 (2007), incorporated herein by reference. An increase in capacity and a reduction in irreversible capacity loss were noted with $Al_2O_3$ coatings by Wu et al., "High Capacity, Surface-Modified Layered Li[Li$_{(1-x)/3}$Mn$_{(2-x)/3}$Ni$_{x/3}$Co$_{x/3}$]O$_2$ Cathodes with Low Irreversible Capacity Loss," Electrochemical and Solid State Letters, 9 (5) A221-A224 (2006), incorporated herein by reference. The use of a LiNiPO$_4$ coating to obtain improved cycling performance is described in an article to Kang et al. "Enhancing the rate capability of high capacity xLi$_2$MnO$_3$ (1–x)LiMO$_2$ (M=Mn, Ni, Co) electrodes by Li—Ni—PO$_4$ treatment," Electrochemistry Communications 11, 748-751 (2009), incorporated herein by reference.

It has been found that metal/metalloid fluoride coatings can significantly improve the performance of lithium rich layered compositions for lithium ion secondary batteries. See, for example, the '814 application and the '735 application cited above, as well as copending U.S. patent application Ser. No. 12/616,226 to Lopez et al., entitled "Coated Positive Electrode Materials for Lithium Ion Batteries," which is incorporated herein by reference. The metal fluoride coatings are found to further improve the performance of the doped materials, especially if the amounts of the materials are appropriately balanced. In particular, the coating improves the capacity of the batteries. However, the coating itself is not electrochemically active. When the loss of specific capacity due to the thickness of coating added to a sample exceeds where the benefit of adding coating is offset by its electrochemical inactivity, reduction in battery capacity can be expected. In general, the amount of coating can be selected to balance the beneficial stabilization resulting from the coating with the loss of specific capacity due to the weight of the coating material that generally does not contribute directly to a high specific capacity of the material.

However, the coatings also influence other properties of the active material, such as the average voltage, thermal stability and impedance. The selection of the coating properties can incorporate additional factors related to the overall range of properties of the material. In general, the coatings can have an average thickness of no more than 25 nm, in some embodiments from about 0.5 nm to about 20 nm, in other embodiments from about 1 nm to about 12 nm, in further embodiments from 1.25 nm to about 10 nm and in additional embodiments from about 1.5 nm to about 8 nm. A person of ordinary skill in the art will recognize that additional ranges of coating material within the explicit ranges above are contemplated and are within the present disclosure. The amount of AlF$_3$ effective in AlF$_3$ coated metal oxide materials to improve the capacity of the uncoated material is related to the particle size and surface area of the uncoated material. Further discussion of the effects on the performance properties for coated lithium rich lithium metal oxides is found in copending U.S. patent application Ser. No. 12/616,226 filed on Nov. 11, 2009 to Lopez et al., entitled "Coated Positive Electrode Materials for Lithium Ion Batteries," incorporated herein by reference.

The fluoride coating can be deposited using a solution based precipitation approach. A powder of the positive electrode material can be mixed in a suitable solvent, such as an aqueous solvent. A soluble composition of the desired metal/metalloid can be dissolved in the solvent. Then, NH$_4$F can be gradually added to the dispersion/solution to precipitate the metal fluoride. The total amount of coating reactants can be selected to form the desired thickness of coating, and the ratio of coating reactants can be based on the stoichiometry of the coating material. The coating mixture can be heated during the coating process to reasonable temperatures, such as in the range from about 60° C. to about 100° C. for aqueous solutions for from about 20 minutes to about 48 hours, to facilitate the coating process. After removing the coated electroactive material from the solution, the material can be dried and heated to temperatures generally from about 250° C. to about 600° C. for about 20 minutes to about 48 hours to complete the formation of the coated material. The heating can be performed under a nitrogen atmosphere or other substantially oxygen free atmosphere. The formation of inert metal oxide coatings, such as Al$_2$O$_3$, and Li—Ni—PO$_4$ coatings are described in the articles cited above.

Battery Performance

Batteries formed from the doped positive electrode active materials described herein have demonstrated superior performance under realistic discharge conditions for moderate current applications. Specifically, the doped active materials have exhibited high tap density, high average discharge voltage, and an improved specific capacity upon cycling of the batteries at moderate discharge rates. In addition, the doped materials can exhibit a slightly decreased irreversible capacity loss which can further improve the decrease in first cycle irreversible capacity loss of coated electroactive materials relative to a corresponding undoped and uncoated material.

In general, various similar testing procedures can be used to evaluate the battery performance. A specific testing procedure is described for the evaluation of the performance values described herein. The testing procedure is described in more detail in the examples below. Specifically, the battery can be cycled between 4.6 volts and 2.0 volts at room temperature unless another temperature is specifically provided, although other voltage ranges can be used with correspondingly different results. The evaluation over the range from 4.6 volts to 2.0 volts is desirable for commercial use since the batteries with active materials described herein generally have stable cycling over this voltage range. In some embodiments, for the first three cycles, a battery is discharged at a rate of C/10 to establish irreversible capacity loss. The battery is then cycled for three cycles at C/5. For cycle 7 and beyond, the battery is cycled at a rate of C/3, which is a reasonable testing rate for medium current applications. Again, the notation C/x implies that the battery is discharged at a rate to discharge the battery to the selected voltage limit in x hours. The battery capacity depends significantly on the discharge rate, with reduced capacity as the discharge rate increases.

In some embodiments, the positive electrode active material has a specific capacity during the tenth cycle at a discharge rate of C/3 of at least about 240 milliamp hours per gram (mAh/g) and in additional embodiments from about 250 mAh/g to about 270 mAh/g. Additionally, the 40$^{th}$ cycle discharge capacity of the material can be at least about 90% of the 10$^{th}$ cycle discharge capacity, in further embodiments at least about 94% and in other embodiments at least about 95% of the 10th cycle discharge capacity, cycled at a discharge rate of C/3. The first cycle irreversible capacity loss for the coated electroactive materials can be no more than about 70 mAh/g, in further embodiments no more than about 60 mAh/g and in additional embodiments no more than about 55 mAh/g. The tap density of the material, which is measured as described below, can be at least about 1.8 g/mL, in further embodiments from about 2 to about 3.5 g/mL and in additional embodiments from about 2.05 to about 2.75 g/mL. High tap density translates into high overall capacity of a battery given a fixed volume. A person of ordinary skill in the art will recognize that additional ranges of specific capacity, cycle capacity, irreversible capacity loss and tap density and of decreases in irreversible capacity loss are contemplated and are within the present disclosure. For fixed volume applications such as batteries for electronic devices, high tap density therefore high overall capacity of the battery is of particular significance.

Generally, tap density is the apparent powder density obtained under stated conditions of tapping. The apparent density of a powder depends on how closely individual particles of the powder are pack together. The apparent density is affected not only by the true density of the solids, but by the particle size distribution, particle shape and cohesiveness. Handling or vibration of powdered material can overcome some of the cohesive forces and allow particles to move relative to one another so smaller particles can work their way into the spaces between the larger particles. Consequently, the total volume occupied by the powder decreases and its density increases. Ultimately no further natural particle packing can be measured without the addition of pressure and maximum particle packing has been achieved. While electrodes are formed with the addition of pressure, a reasonably amount of pressure is only effective to form a certain packing density of the electroactive materials in the battery electrode. The actual density in the electrode generally relates to the tap density measured for a powder so that the tap density measurements are predictive of the packing density in a battery electrode with a higher tap density corresponding to a higher packing density in the battery electrode.

Under controlled conditions of tap rate, drop height and container size, the tap density obtained can be highly reproducible. The tap density of a positive electrode active material described herein can be measured by using graduated measuring cylinders on a commercially available tap machine with pre-determined tapping parameters.

The average voltage of a material can be a significant parameter. A higher average voltage can indicate the ability to deliver additional power. Modest amounts of doping with a +2 cation can result in an increase in average voltage while other advantageous properties can also be exploited. In some embodiments, the average voltage can be at least about 3.60 volts, in further embodiments at least about 3.61 volts and in additional embodiments at least about 3.62 volts, when discharged at a C/3 rate between 4.6 volts and 2.0 volts. A person of ordinary skill in the art will recognize that additional ranges of average voltage within the explicit ranges above are contemplated and are within the present disclosure.

EXAMPLES

Example 1

Reaction of Metal Sulfate with $Na_2CO_3/NH_4OH$ for Carbonate Co-Precipitation

This example demonstrates the formation of a desired cathode active material using a carbonate or hydroxide co-precipitation process. Stoichiometric amounts of metal precursors were dissolved in distilled water to form an aqueous solution with the metals in the desired molar ratios. Separately, an aqueous solution containing $Na_2CO_3$ and/or $NH_4OH$ was prepared. For the formation of the samples, one or both solutions were gradually added to a reaction vessel to form metal carbonate or hydroxide precipitates. The reaction mixture was stirred, and the temperature of the reaction mixture was kept at a temperature between room temperature and 80° C. The pH of the reaction mixture was in the range from 6-12. In general, the aqueous transition metal solution had a concentration from 1M to 3M, and the aqueous $Na_2CO_3/NH_4OH$ solution had a $Na_2CO_3$ concentration of 1M to 4M and/or a $NH_4OH$ concentration of 0.2-2M. The metal carbonate or hydroxide precipitate was filtered, washed multiple times with distilled water, and dried at 110° C. for about 16 hrs to form a metal carbonate or hydroxide powder. Specific ranges of reaction conditions for the preparation of the samples are further outlined in Table 1, where the solution may not include both $Na_2CO_3$ and $NH_4OH$.

TABLE 1

| Reaction Process Condition | Values |
| --- | --- |
| Reaction pH | 6.0-12.0 |
| Reaction time | 0.1-24 hr |
| Reactor type | Batch |
| Reactor agitation speed | 200-1400 rpm |
| Reaction temperature | RT-80° C. |
| Concentration of the metal salts | 1-3M |
| Concentration of $Na_2CO_3$ | 1-4M |
| Concentration of $NH_4OH$ | 0.2-2M |
| Flow rate of the metal salts | 1-100 mL/min |
| Flow rate of $Na_2CO_3$ & $NH_4OH$ | 1-100 mL/min |

An appropriate amount of $Li_2CO_3$ powder was combined with the dried metal carbonate or hydroxide powder and thoroughly mixed with a Jar Mill, double planetary mixer, or dry powder rotary mixer to form a homogenous powder mixture. A portion, e.g. 5 grams, of the homogenized powders was calcined in a step to form the oxide, followed by an additional mixing step to further homogenize the powder. The further homogenized powder was again calcined to form the highly crystalline lithium composite oxide. The product composition was determined to be approximately represented by $Li_{1.2}Ni_{0.175}Mn_{0.525-y}Co_{0.10}Mg_yO_2$. Compositions with a range of γ values from 0 (undoped) to about 0.10 are described in the following examples. Specific ranges of calcination conditions are further outlined in Table 2.

TABLE 2

| | Calcination Process Condition | Values |
| --- | --- | --- |
| 1st Step | temperature | 400-800° C. |
| | time | 1-24 hr |
| | protective gas | Nitrogen or Air |
| | Flow rate of protective gas | 0-50 scfh |
| 2nd Step | temperature | 700-1100° C. |
| | time | 1-36 hr |
| | protective gas | Nitrogen or Air |
| | Flow rate of protective gas | 0-50 scfh |

Figure 2:
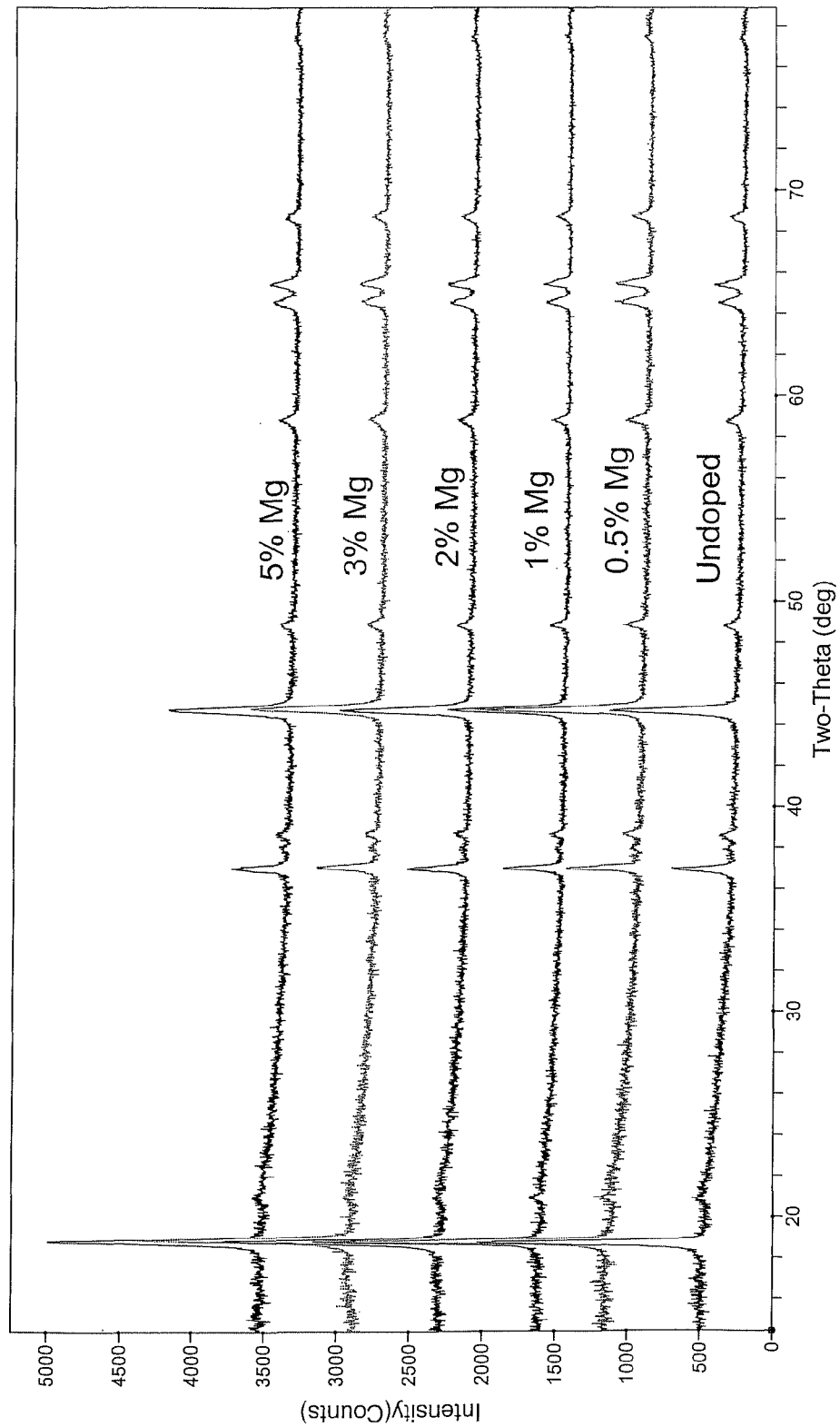
FIG. 2 is a graph showing X-ray diffraction patterns of 0, 0.5, 1, 2, 3, and 5% of Mg doped positive electrode active materials described in Example 1.
Figure 3:
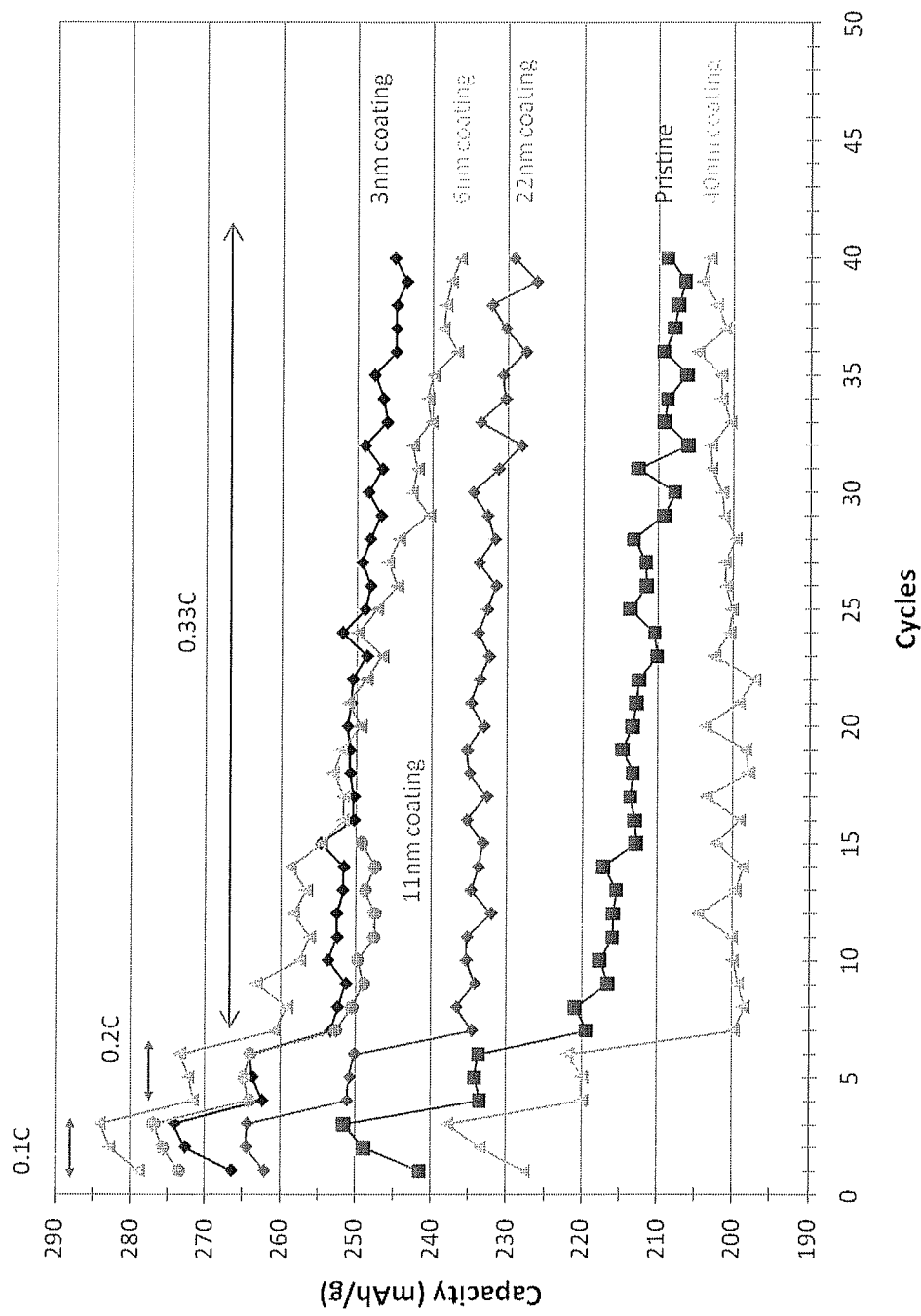
FIG. 3 is a graph with plots of specific discharge capacity versus cycle number of batteries formed with positive electroactive materials lacking a Mg dopant having 0, 3, 6, 22, and 40 nm $AlF_3$ coating composition.
Figure 4:
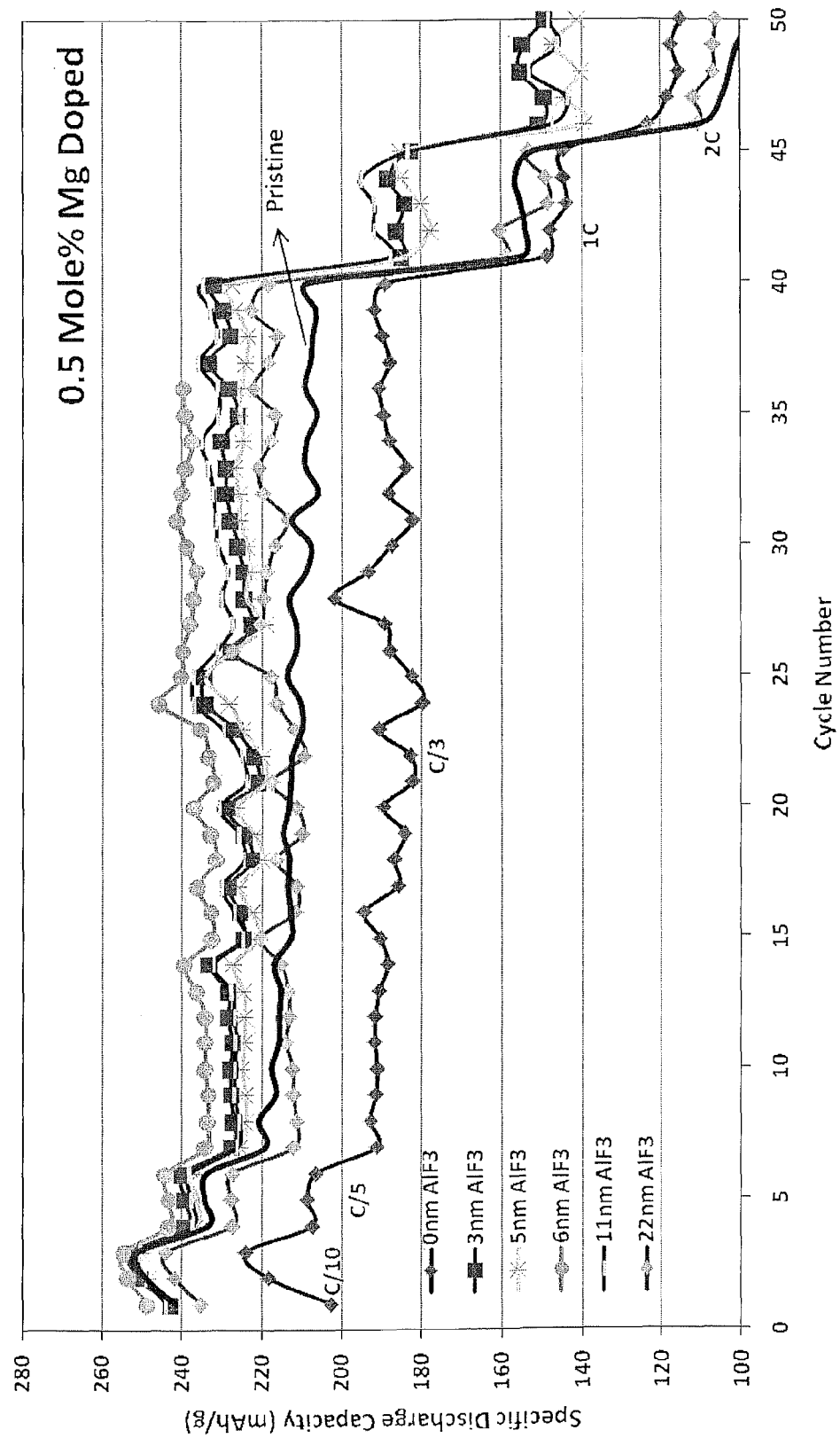
FIG. 4 is a graph with plots of specific discharge capacity versus cycle number of batteries formed with positive electroactive materials containing 0.5 mole percent Mg with 0, 3, 5, 6, 11, and 22 nm $AlF_3$ coating composition. A sample with no Mg doping and no $AlF_3$ coating is included as a control.
Figure 5:
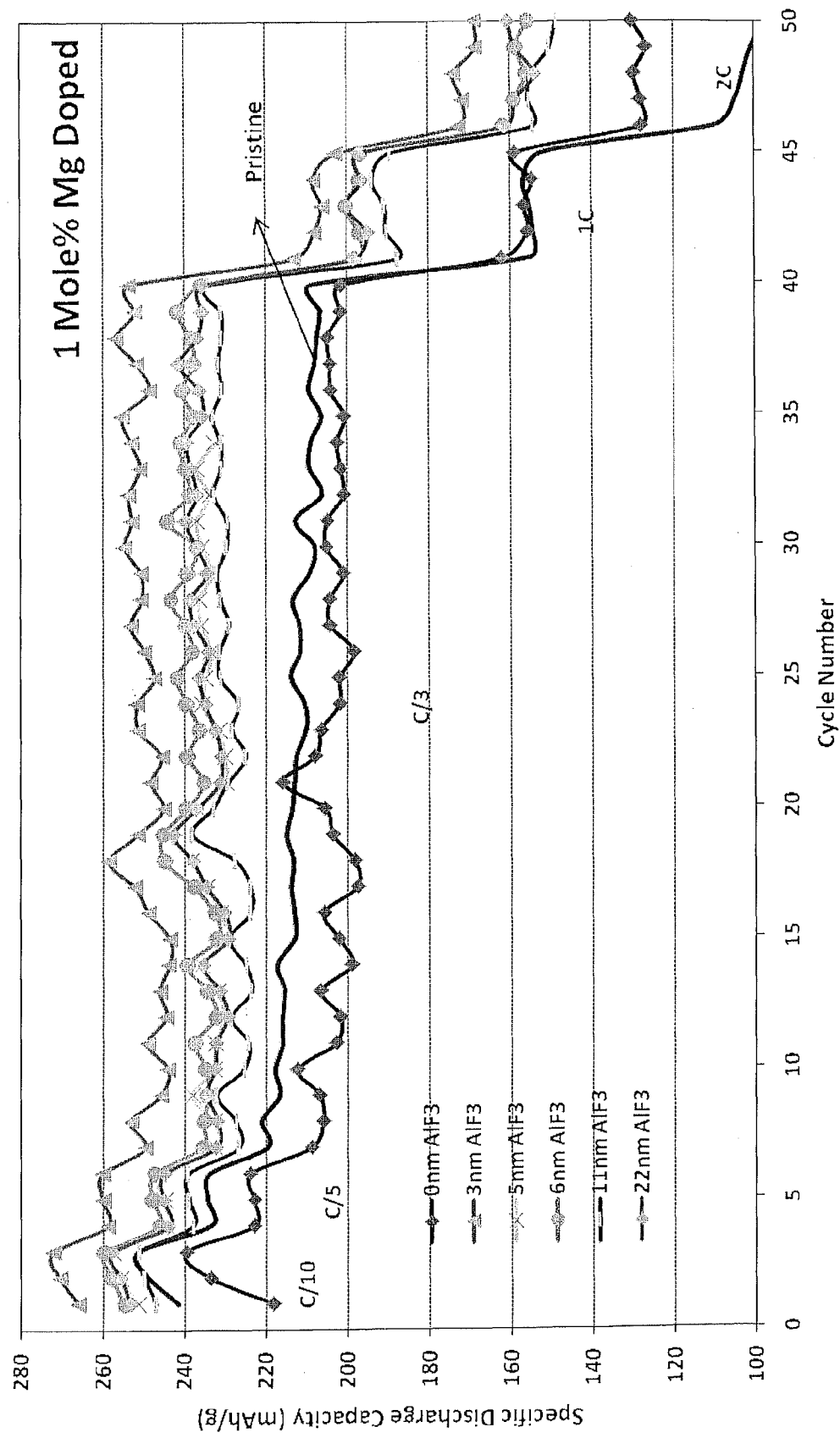
FIG. 5 is a graph with plots of specific discharge capacity versus cycle number of batteries formed with positive electroactive materials containing 1.0 mole percent Mg with 0, 3, 5, 6, 11, and 22 nm $AlF_3$ coating composition. A sample with no Mg doping and no $AlF_3$ coating is included as a control.
Figure 6:
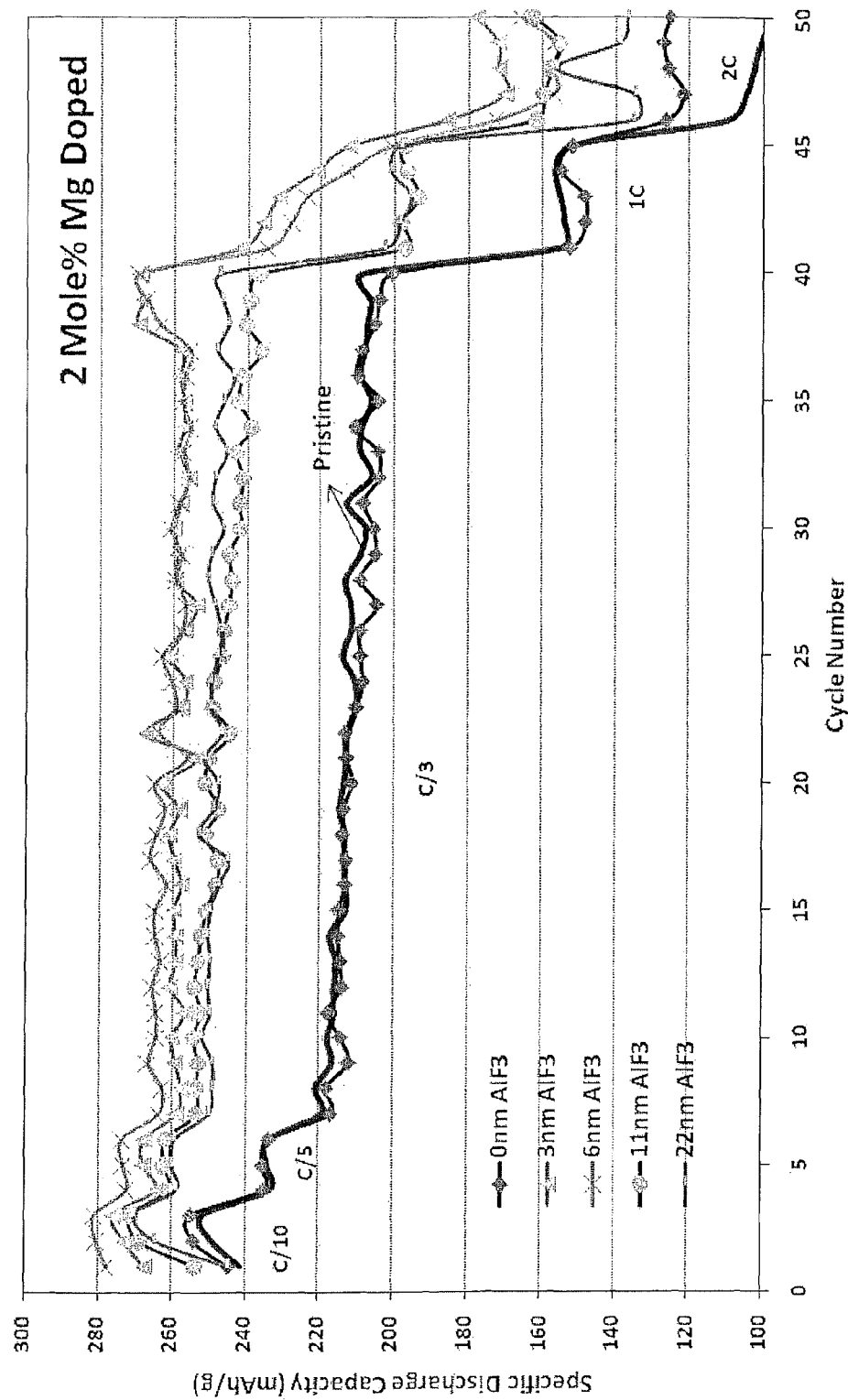
FIG. 6 is a graph with plots of specific discharge capacity versus cycle number of batteries formed with positive electroactive materials containing 2.0 mole percent Mg with 0, 3, 6, 11, and 22 nm $AlF_3$ coating composition. A sample with no Mg doping and no $AlF_3$ coating is included as a control.
Figure 8:
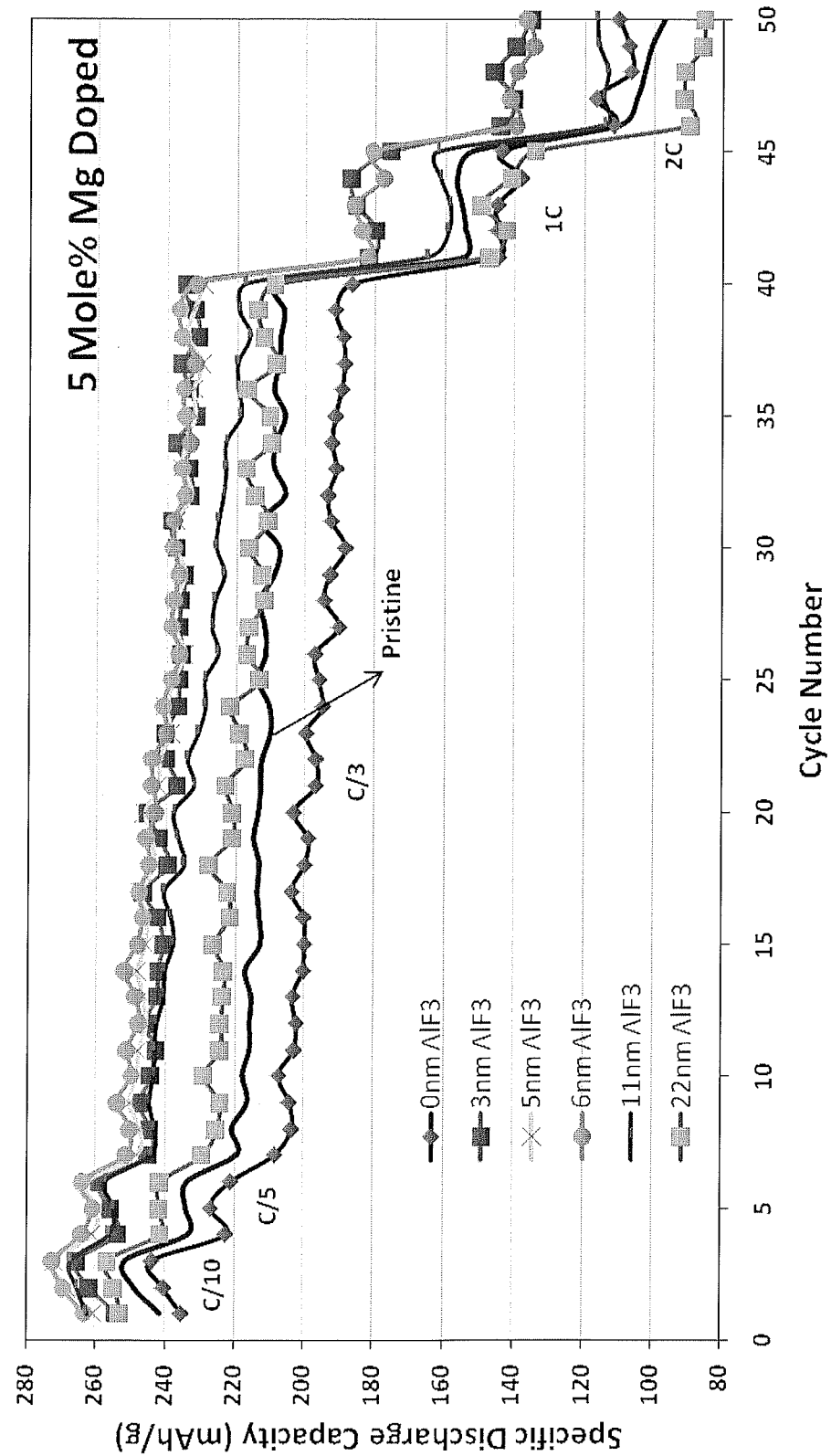
FIG. 8 is a graph with plots of specific discharge capacity versus cycle number of batteries formed with positive electroactive materials containing 5.0 mole percent Mg with 0, 3, 5, 6, 11, and 22 nm $AlF_3$ coating composition. A sample with no Mg doping and no $AlF_3$ coating is included as a control.

The positive electrode composite material particles thus formed generally have a substantially spherical shape and are relatively homogenous in size. X-ray diffraction patterns of 0.5%, 1%, 2%, 3%, and 5% Mg doped positive electrode active material are generally the same as the undoped material as shown in FIG. 2. The similar X-ray patterns of the undoped and doped materials suggest the general crystal structural characteristics of the material are not significantly altered by the doping. The composites synthesized were then used to form coin cell batteries following the procedure outlined above. The coin cell batteries were tested, and the results are described in examples below.

The composition of the product materials was checked with inductively coupled plasma-optical emission spectroscopy (ICP-OES). The samples were submitted to ICP-OES for elemental analysis to confirm the presence of magnesium. This data confirms that the product composition comprised Mg.

Example 2

Formation of AlF$_3$ Coated Metal Oxide Materials

This example described the formation of an aluminum fluoride coating onto the lithium metal oxide particles. The battery performance properties of the coated particles are described in later examples.

Some of the lithium metal oxide particles prepared in Example 1 were coated with a layer of aluminum fluoride (AlF$_3$) using a solution-based method. For a selected amount of aluminum fluoride coating, appropriate amount of saturated solution of aluminum nitrate was prepared in an aqueous solvent. The metal oxide particles were then added into the aluminum nitrate solution to form a mixture. The mixture was mixed vigorously for a period of time to homogenize. After homogenization, a stoichiometric amount of ammonium fluoride was added to the homogenized mixture to form aluminum fluoride precipitate which coats the lithium metal oxide particles. After the addition of the ammonium fluoride, the mixture was stirred at a temperature of 40° C.-80° C. for 1-12 hrs. The mixture was then filtered, and the solid was washed repeatedly to remove any un-reacted materials. After washing, the solid was calcined in nitrogen atmosphere at 400-600° C. for 2-24 hrs to form the AlF$_3$ coated metal oxide material.

Specifically, samples of lithium metal oxide (LMO) particles synthesized as described in Example 1, were coated with aluminum fluoride at thicknesses of 3 nm, 6 nm, 11 nm and 22 nm using the process described in this example. The aluminum fluoride coated LMOs were then used to form coin cell batteries following the procedure outlined above, and the results are described below.

Example 3

Tap Density Results of Different Metal Oxide Materials

This example provides tap density values for the doped metal oxides with and without inert coatings to demonstrate that good values of tap density can be achieved for the positive electrode materials described herein.

An AUTOTAP™ machine from Quantachrome Instruments (Boynton Beach, Fla.) was used to measure tap density of the samples synthesized in Examples 1 and 2. In a typical measurement process, a 4 gram quantity of sample powder was weighed out and placed in a graduated cylinder (10 mL). The cylinder was then mounted on a wheel of the AUTO-TAP™ that taps at a tap rate of 260 min$^{-1}$ with a drop height of 3 mm. After 2000 taps the volume of the powder was determined by using the measurement markings on the graduated cylinder. The initial weight of the sample divided by the measured volume after tapping gives the tap density in g/mL unit of the sample. The tap densities of samples prepared as described in Examples 1 and 2 were measured, and representative tap densities of 1.6-1.8 have been obtained. Materials with these representative tap densities were used to form the batteries in the following examples.

Battery Examples 4-8

The coin cell batteries tested in Examples 4-8 were all performed using coin cell batteries produced following a procedure outlined here. To form the positive electrode compositions, the lithium metal oxide (LMO) powders were mixed thoroughly with acetylene black (Super P™ from Timcal, Ltd, Switzerland) and graphite (KS 6™ from Timcal, Ltd) to form a homogeneous powder mixture. Separately, Polyvinylidene fluoride PVDF (KF1300™ from Kureha Corp., Japan) was mixed with N-methyl-pyrrolidone (Honeywell—Riedel-de-Haen) and stirred overnight to form a PVDF-NMP solution. The homogeneous powder mixture was then added to the PVDF-NMP solution and mixed for about 2 hours to form a homogeneous slurry. The slurry was applied onto an aluminum foil current collector to form a thin wet film using a doctor's blade coating process.

A positive electrode material was formed by drying the aluminum foil current collector with the thin wet film in vacuum oven at 110° C. for about two hours to remove NMP solvent. The dried positive electrode material on the current collector was pressed between rollers of a sheet mill to obtain a positive electrode with desired thickness. An example of a positive electrode composition developed using above process having a LMO:acetylene black:graphite:PVDF weight ratio of 80:5:5:10 is presented below.

The positive electrode was placed inside an argon filled glove box for the fabrication of the coin cell batteries. Lithium metal foil was used as a negative electrode. The electrolyte was a 1 M solution of LiPF$_6$ formed by dissolving LiPF$_6$ salt in a mixture of ethylene carbonate, diethyl carbonate and dimethyl carbonate (from Ferro Corp., Ohio USA) at a 1:1:1 volumetric ratio. A trilayer (polypropylene/polyethylene/polypropylene) micro-porous separator (2320 from Celgard, LLC, NC, USA) soaked with electrolyte was placed between the positive electrode and the negative electrode. A few additional drops of electrolyte were added between the electrodes. The electrodes were then sealed inside a 2032 coin cell hardware (Hohsen Corp., Japan) using a crimping process to form a coin cell battery. The resulting coin cell batteries were tested with a Maccor cycle tester to obtain charge-discharge curve and cycling stability over a number of cycles.

Example 5

Capacity and Cycling of Mg Doped Lithium-Rich Oxides

This example demonstrates the improved capacity and cycling performance of coin cells formed with the magnesium doped lithium metal oxides with and without coatings.

Figure 9:
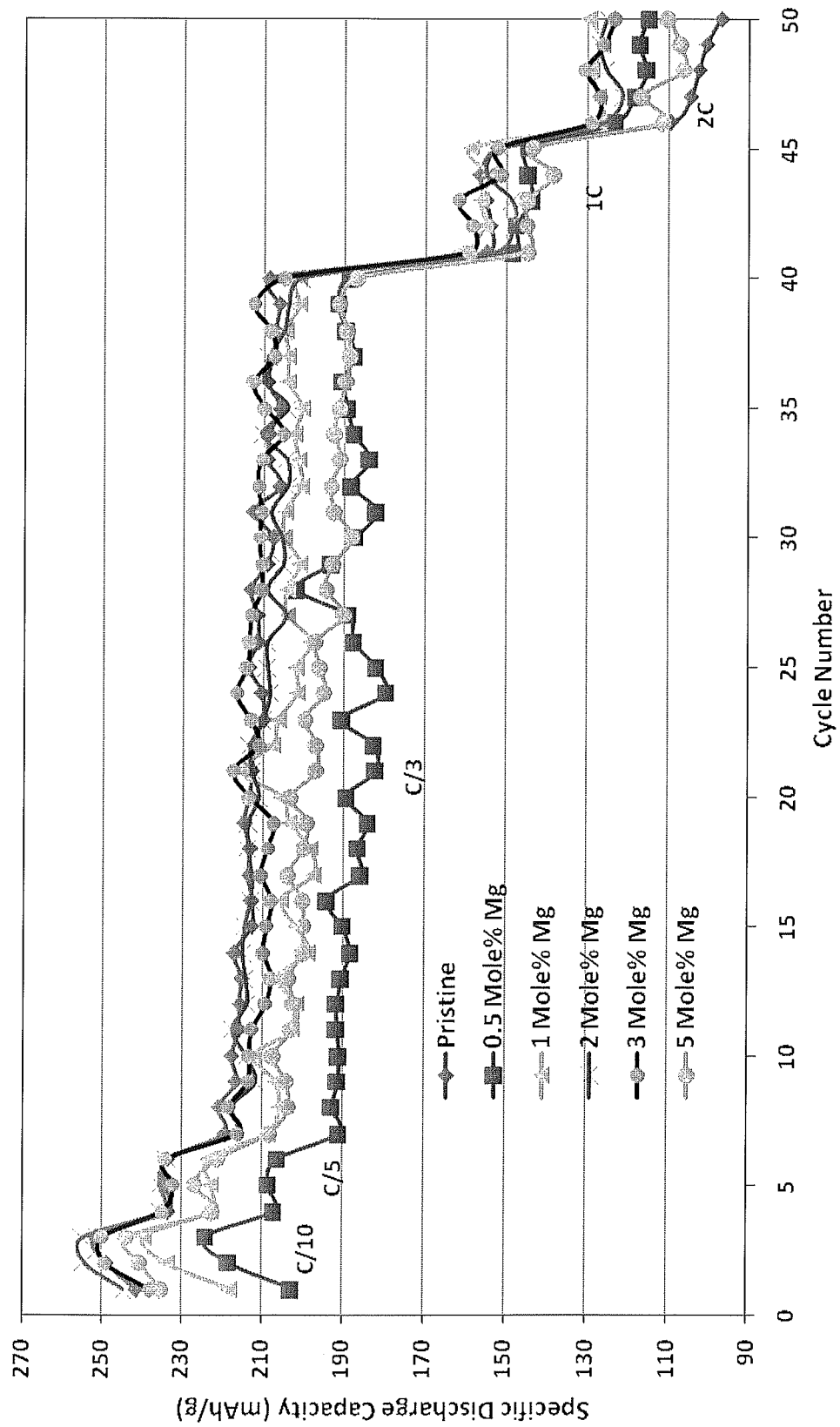
FIG. 9 is a graph with plots of specific discharge capacity versus cycle number of batteries formed with positive electroactive materials containing 0, 0.5, 1, 2, 3, 5 mole percent Mg with no AlF3 Coating composition.

Coin cells were formed from the powders synthesized as described in Examples 1 and 2. The coin cell batteries were tested for 50 charge discharge cycles at discharge rates of C/10 for cycles 1-3, C/5 for cycles 4-6, C/3 for cycles 7-40, 1C for cycles 41-45 and 2C for cycles 46-50. With the exception of the C/10 charge/discharge cycles, all other testing occurred at C/5 charge, with the corresponding discharge rates (C/5, C/3, 1C and 2C). Plots of specific discharge capacity versus cycle life of the coin cell batteries are shown in FIGS. 3-8. Specifically, graphs shown in FIG. 3, FIG. 4, FIG. 5, FIG. 6, FIG. 7, and FIG. 8 are directed to composite materials containing undoped, 0.5 mole %, 1.0 mole %, 2.0 mole %, 3.0 mole %, and 5.0 mole % Mg, respectively, where the mole percent values correspond with 100y with y specified in the following formula, Li$_{1.2}$Ni$_{0.175}$Mn$_{0.525-y}$Co$_{0.10}$Mg$_y$O$_2$. We note that at high rates, the materials with 1-3 mole % Mg had the highest specific capacities with the best coating thickness. Each figure includes a set of results for uncoated material and varying amounts of AlF$_3$ coating material. For comparison with the results for the doped samples, capacity for an undoped, uncoated material is also presented in each figure and labeled as "pristine". Graphs are presented in FIG. 9 comparing the specific discharge capacity for different values of Mg doping (pristine-undoped, 0.5 mole %, 1.0 mole %, 2.0 mole %, 3.0 mole % and 5.0 mole %) for samples without a aluminum fluoride coating. The sample with no Mg doping and no AlF3 coating is included as a control. FIG. 9 shows that the specific discharge capacity values are comparable between pristine-undoped, 2 mole percent Mg and 3 mole percent Mg out to 39 cycles, and the performance of the batteries with the Mg doped samples is better at the higher rates (1C, 2C). From these plots, the samples with 2% and 3% Mg doping demonstrated the best performance with respect to specific capacity. The materials with 2 mole % Mg doping demonstrated the best cycling performance over the ranges of dopant and coatings tested.

Figure 10:
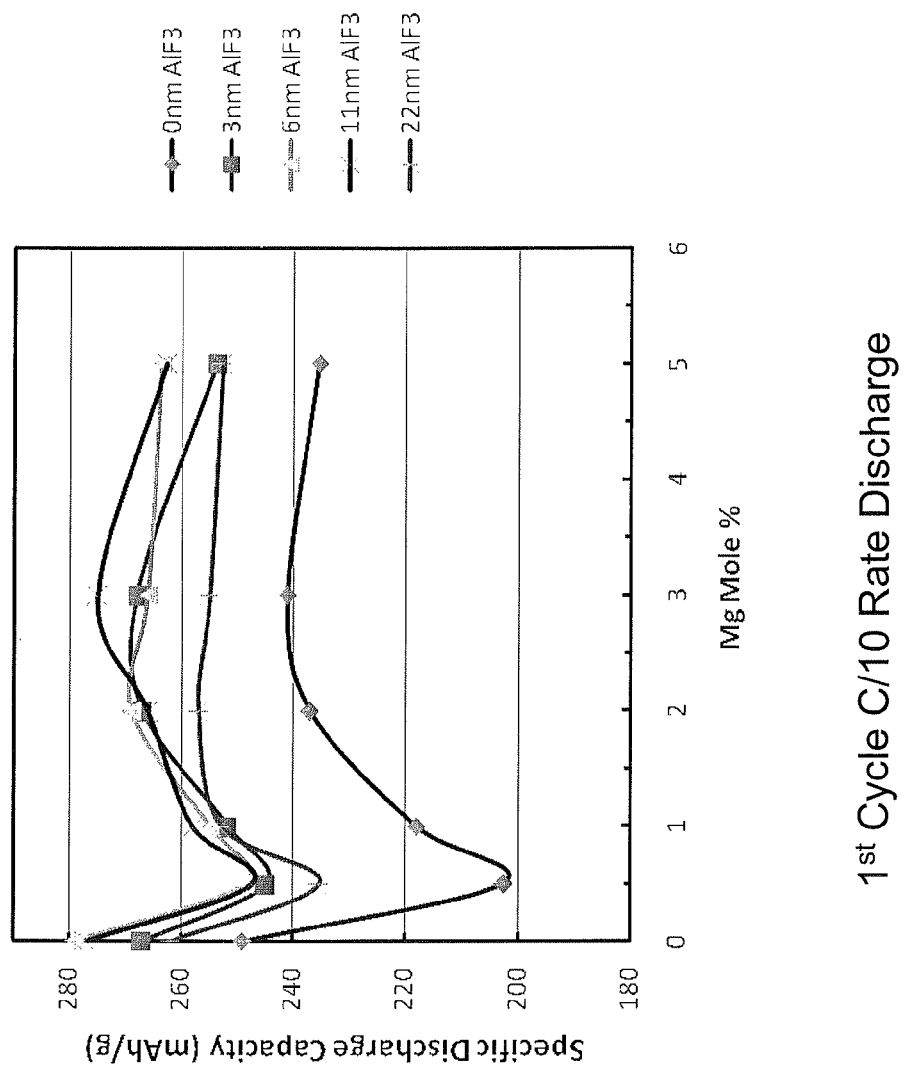
FIG. 10 is a graph with plots of first cycle specific discharge capacity at a C/10 rate versus mole percentage of Mg with 0, 3, 6, 11, and 22 nm $AlF_3$ coating composition.

The first cycle specific discharge capacities of the batteries formed with differently doped positive electrode material with various thickness of $AlF_3$ coating are plotted against mole percentage of Mg, and the results are shown in FIG. 10. As shown in FIG. 10, the battery formed from the positive electrode material without $AlF_3$ coating demonstrated lowest first cycle overall specific capacity regardless of the mole percentage of Mg doping. The battery formed from the positive electrode materials with 3 nm, 6 nm, and 11 nm of $AlF_3$ coatings demonstrated similar first cycle overall specific capacities throughout the mole percentages of Mg doping, which are better than those of positive electrode materials with 22 nm $AlF_3$ coating.

Figure 11:
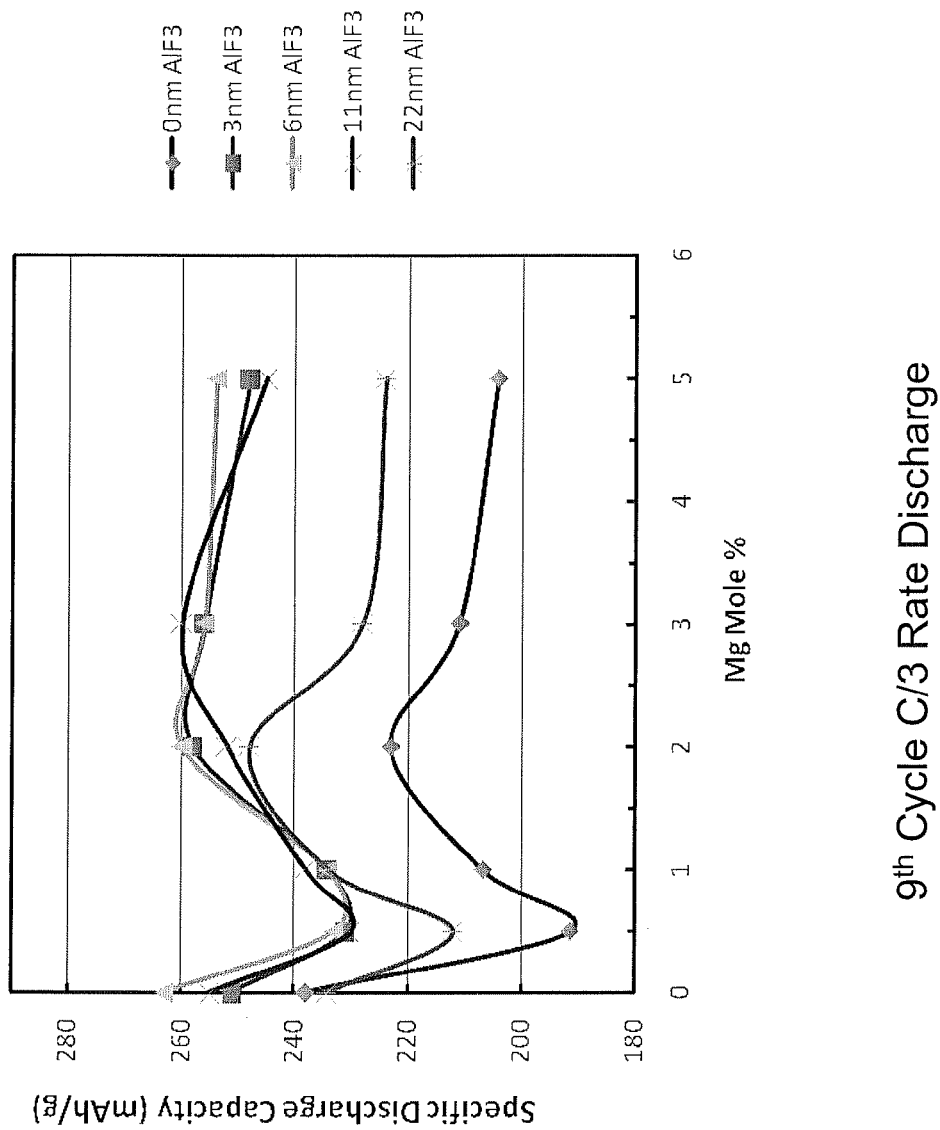
FIG. 11 is a graph with plots of the 9th cycle specific discharge capacity at a C/3 rate versus mole percentage of Mg with 0, 3, 6, 11, and 22 nm $AlF_3$ coating composition.

Similarly, the $9^{th}$ cycle specific discharge capacities of the batteries formed with differently doped positive electrode material with various thickness of $AlF_3$ coating are plotted against mole percentage of Mg, and the results are shown in FIG. 11. As shown in FIG. 11 and similar to FIG. 10, the battery formed from the positive electrode material without $AlF_3$ coating demonstrated lowest overall $9^{th}$ cycle specific capacity regardless of the mole percentage of Mg doping. The battery formed from the positive electrode materials with 3 nm, 6 nm, and 11 nm of $AlF_3$ coatings demonstrated similar $9^{th}$ cycle overall specific capacities throughout the mole percentages of Mg doping, which are better than those of positive electrode materials with 22 nm $AlF_3$ coating.

Figure 12:
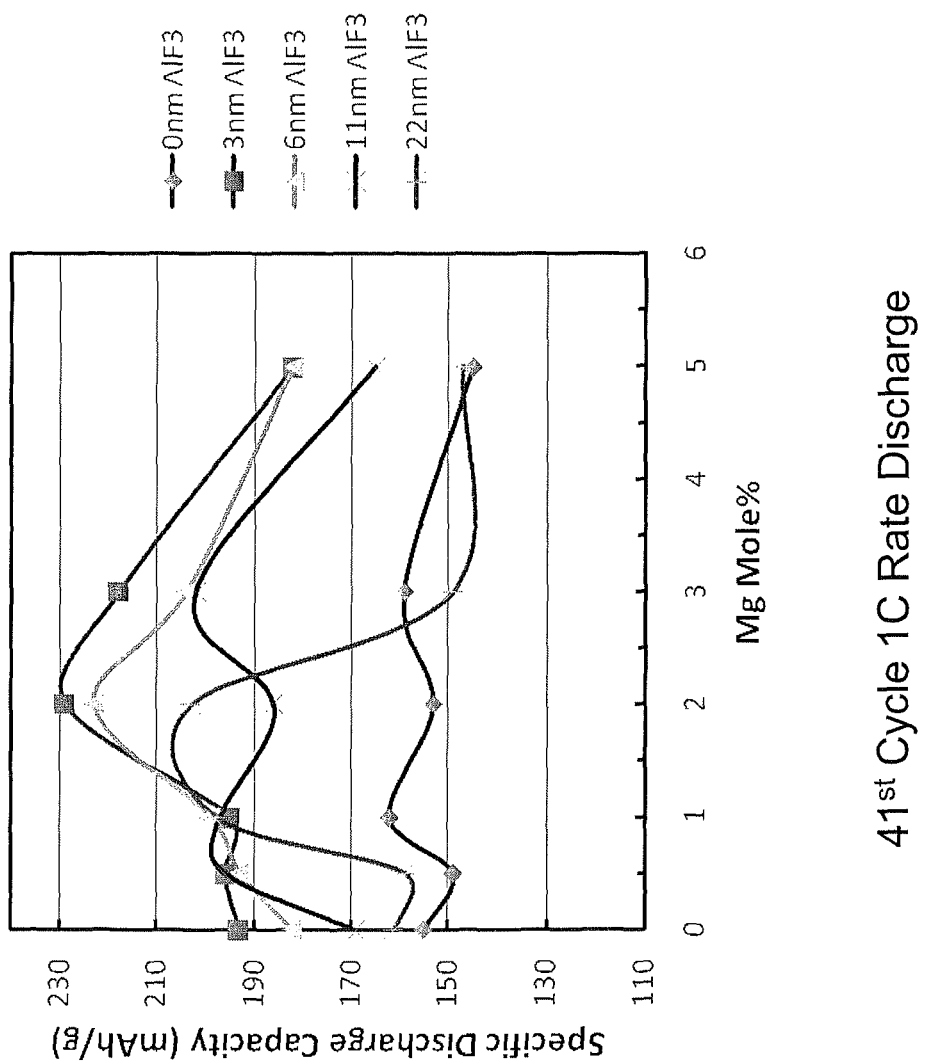
FIG. 12 is a graph with plots of 41$^{st}$ cycle specific discharge capacity at 1C rate versus mole percentage of Mg with 0, 3, 6, 11, and 22 nm AlF$_3$ coating composition.

The 41st cycle specific discharge capacities are plotted against mole percentage of Mg in FIG. 12 for positive electrode active materials with various $AlF_3$ coating thicknesses. At the 41st cycle, the cell was charged at C/5 and discharged at a rate of 1C. Again, batteries formed with the uncoated samples or samples with 22 nm thick coatings tended to have the lowest capacities. With the 3 nm and 6 nm $AlF_3$ surface coated samples, higher specific discharge capacities at this higher rate were observed for batteries with the (2, 3 mole percent) Mg doping. The specific discharge capacity results do not follow any trend when the coating thickness increases to values of 11 nm and 22 nm.

Figure 13:
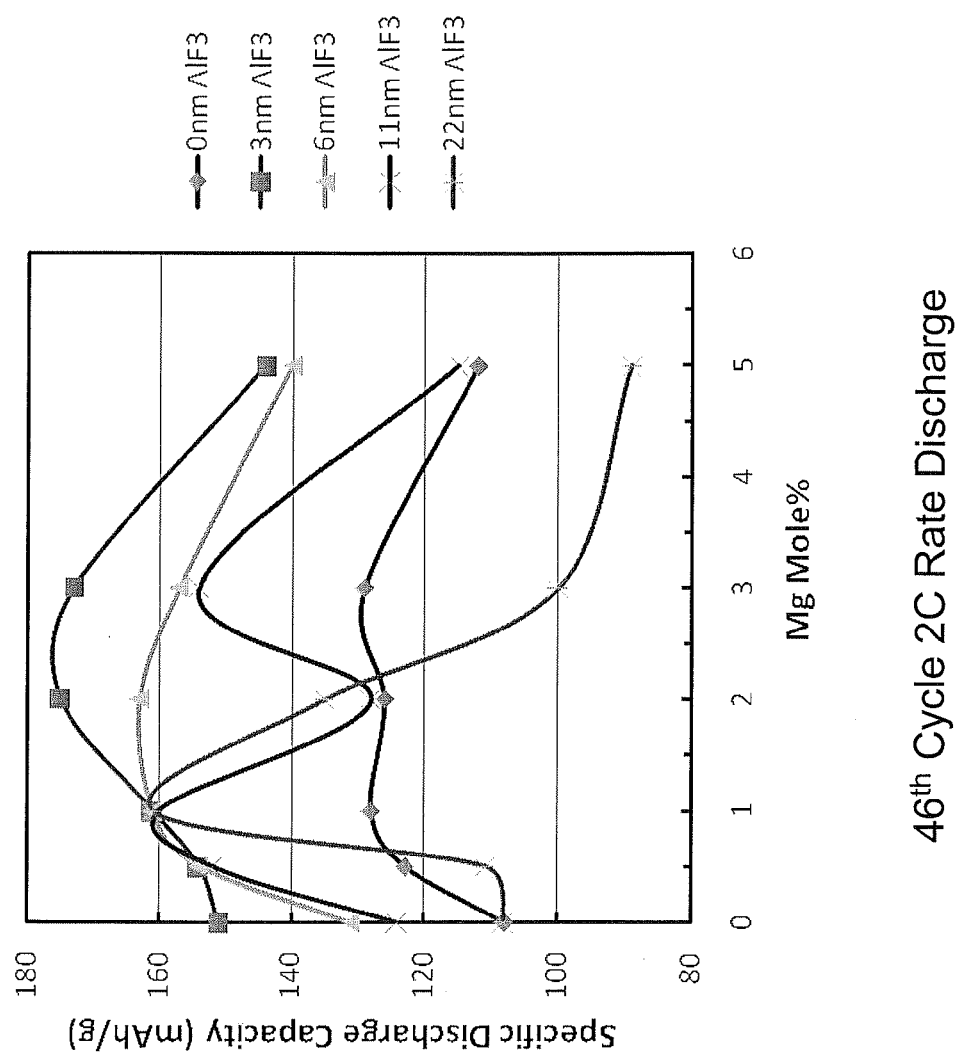
FIG. 13 is a graph with plots of 46$^{th}$ cycle specific discharge capacity at 2C rate versus mole percentage of Mg with 0, 3, 6, 11, and 22 nm AlF$_3$ coating composition.

In addition, the 46th cycle specific discharge capacities are plotted against mole percentage of Mg in FIG. 13 for positive electrode active materials with various $AlF_3$ coating thicknesses. At the 46th cycle, the discharge rate was 2C. These results displayed greater variation with amount of Mg doping. However, batteries formed with samples having a 3 nm or a 6 nm coating of $AlF_3$ generally had the greatest specific discharge capacities. At these higher discharge rates, moderate amounts of Mg doping resulted in an increase in the specific discharge capacity relative to batteries with undoped samples for both uncoated samples and coated samples.

Example 6

Average Voltage for Batteries with Mg Doped Compositions

This example demonstrates that relatively high average voltage results can be obtained with the Mg doped compositions.

Figure 15:
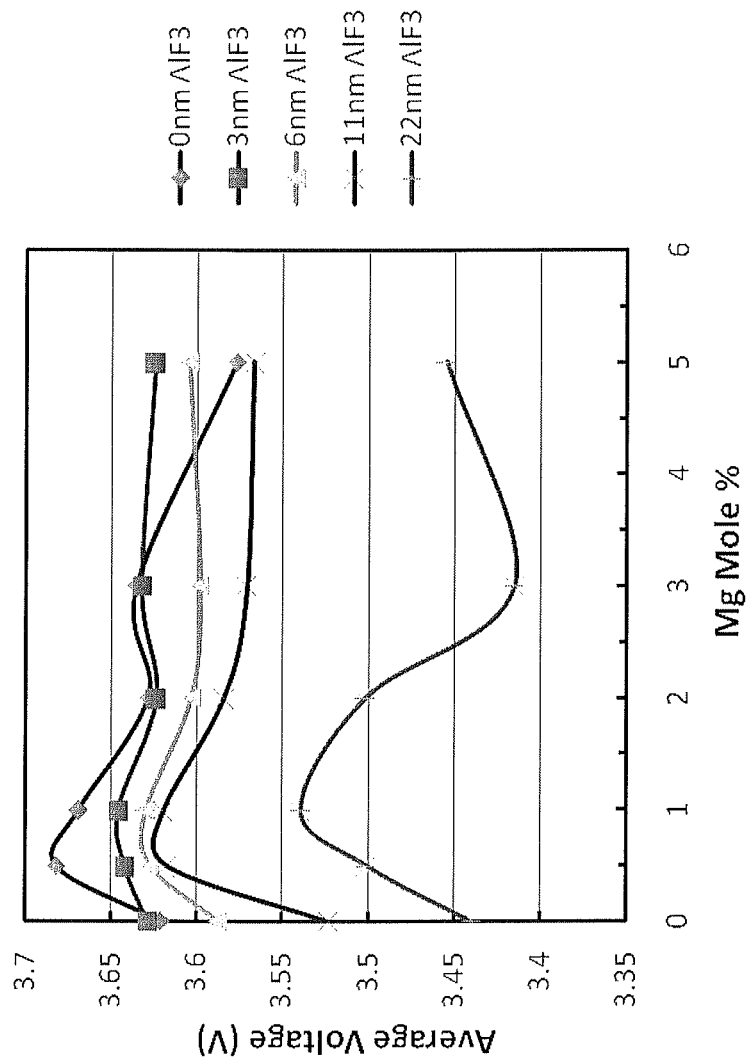
FIG. 15 is a graph with plots of first discharge cycle average voltage versus mole percentage of Mg with 0, 3, 6, 11, and 22 nm AlF$_3$ coating composition.

The average voltage was obtained in the first discharge cycle for a discharge from 4.6V to 2V at a discharge rate of C/10. A plot of average voltage as a function of $AlF_3$ coating amount of variously Mg doped material is shown in FIG. 14a. FIG. 14a shows that the first discharge cycle average voltage of the batteries decrease with the increase of the thickness of $AlF_3$ coating. A plot of average voltage as a function of uncoated variously Mg doped material is shown in FIG. 14b. Both FIGS. 14a and 14b have shown that the 0.5 mole % and 1.0 mole % Mg doped material have higher first discharge cycle average voltage than the other compositions. A plot of average voltage as a function of mole percentage of Mg doped materials with varying $AlF_3$ coating thickness is shown in FIG. 15, with the sample having 22 nm $AlF_3$ coating showing the least average voltage.

Example 7

Irreversible Capacity Loss for Mg Doped Samples

This example demonstrates a decrease in irreversible capacity loss for samples in which the positive electrode comprises Mg doped materials.

As noted above, the irreversible capacity loss is the difference between the first charge capacity and the first discharge capacity for the battery. Coin cell batteries were produced using doped cathode active materials described in Example 1 with an optional $AlF_3$ coating as described in Example 2. A plot of irreversible capacity loss as a function of the thickness of the coating is presented in FIG. 16a. For samples that lack a coating, a plot of irreversible capacity loss as a function of Mg doping levels is presented in FIG. 16b.

Figure 17:
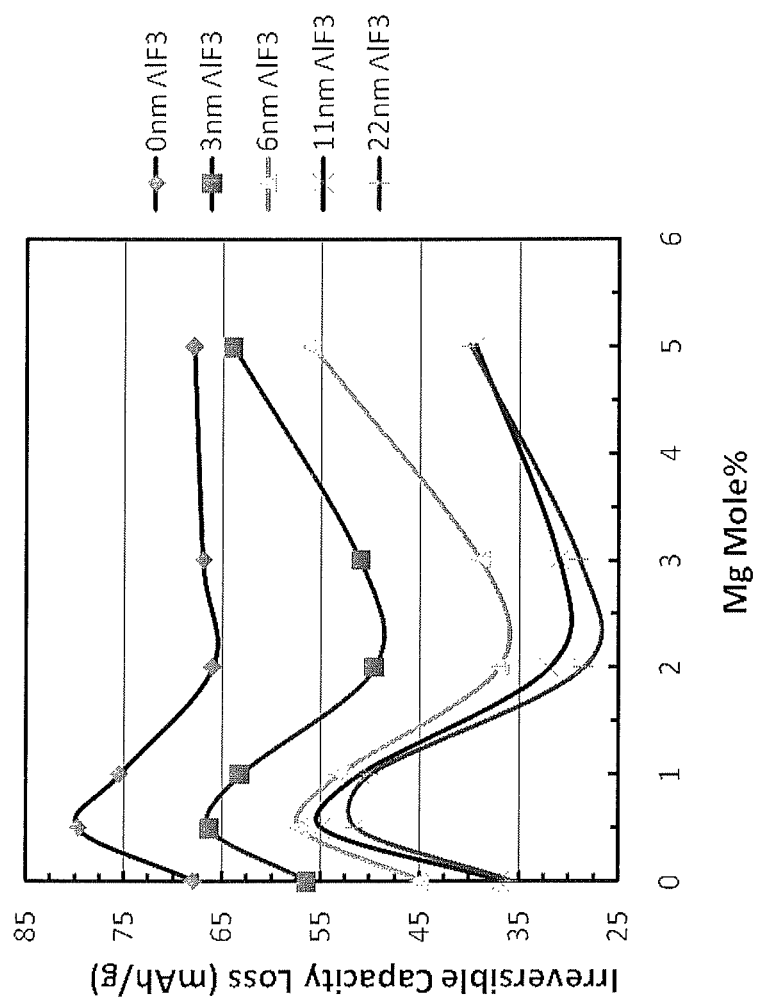
FIG. 17 is a graph with plots of first cycle irreversible capacity loss versus mole percentage of Mg with 0, 3, 6, 11, and 22 nm AlF$_3$ coating composition.

A plot of irreversible capacity loss as a function of mole percentage of Mg with various $AlF_3$ coating amounts is presented in FIG. 17. In general, both the addition of the Mg dopant and the coating reduce the irreversible capacity loss.

Example 8

Impedance Measurements

This example examines the complex impedance measurements on batteries formed with the metal oxide compositions synthesized as described in Example 1 with evidence that the magnesium dopant can improve the rate capability of the resulting material.

Coin cells were formed with the lithium rich metal oxides without a fluoride coating. An AC current was applied across the electrodes over a range of frequencies. The complex impedance is evaluated from the current measures with the AC voltage. The analysis of complex impedance measurements is described further in Ho et al., "Application of A-C Techniques to the Study of Lithium Diffusion in Tungsten Trioxide Thin Films," Semiconductor Electrodes 127(2), (February 1980) 343-350, incorporated herein by reference. In a first set of experiments, the battery was charged to 4.6V in an initial charge step prior to performing the impedance measurements.

Figure 18:
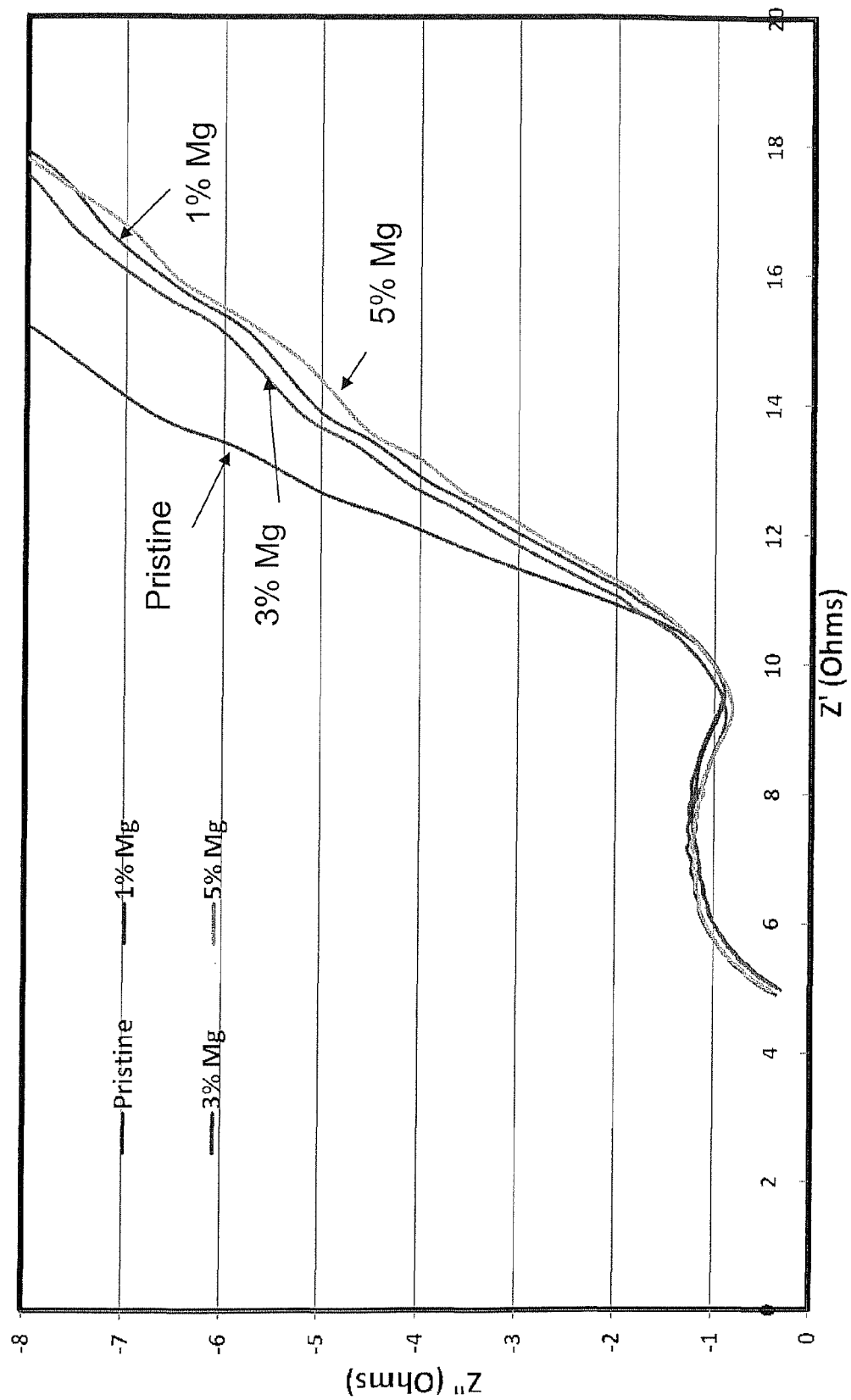
FIG. 18 is a plot of complex impedance for batteries with 100% state of charge formed with uncoated positive electrode active material with non-Mg dopant, 1 mole % Mg dopant, 3 mole % Mg dopant and 5 mole % Mg dopant.
Figure 19:
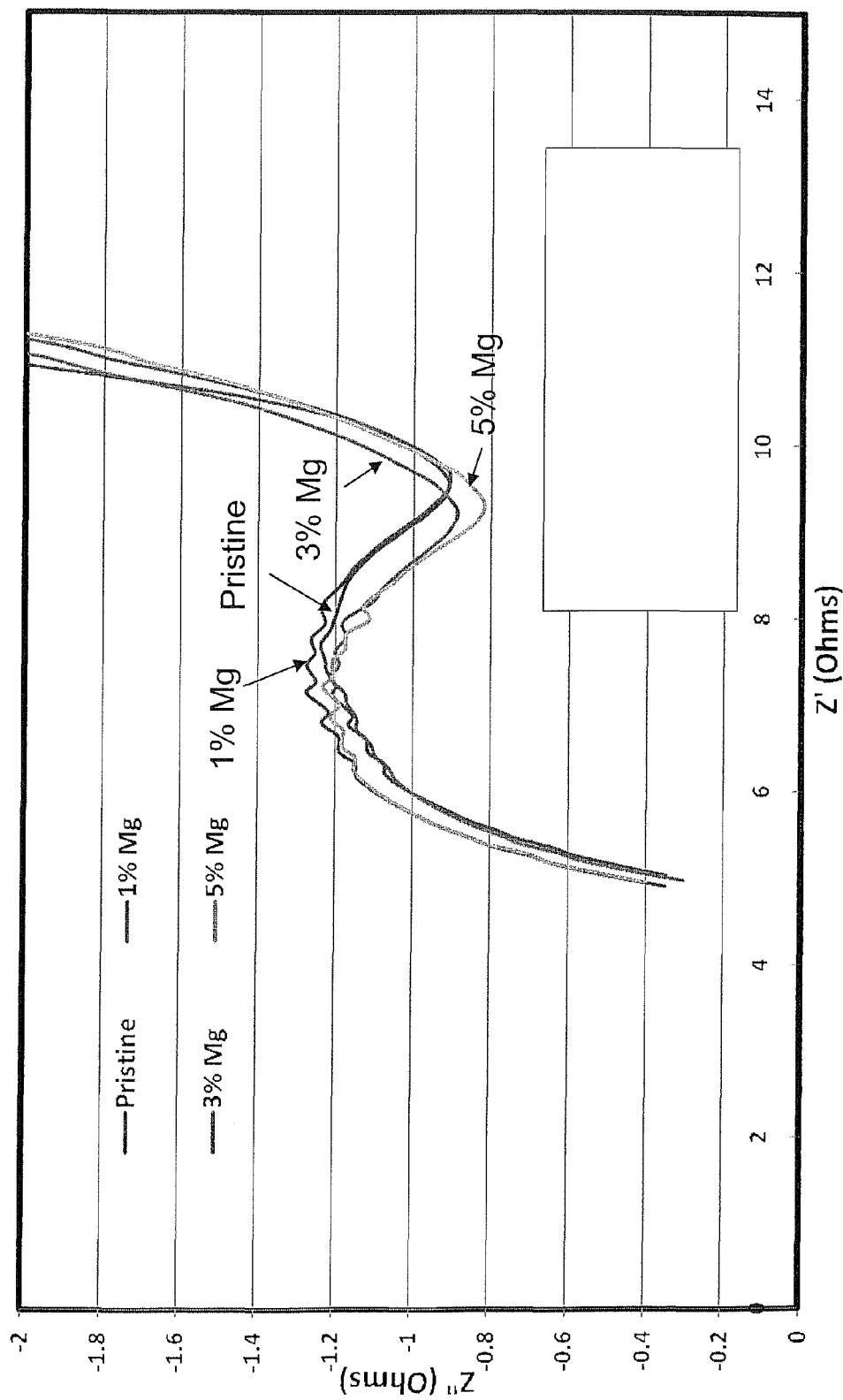
FIG. 19 is an expanded view of a portion of a plot of complex impedance in FIG. 17.
Figure 20:
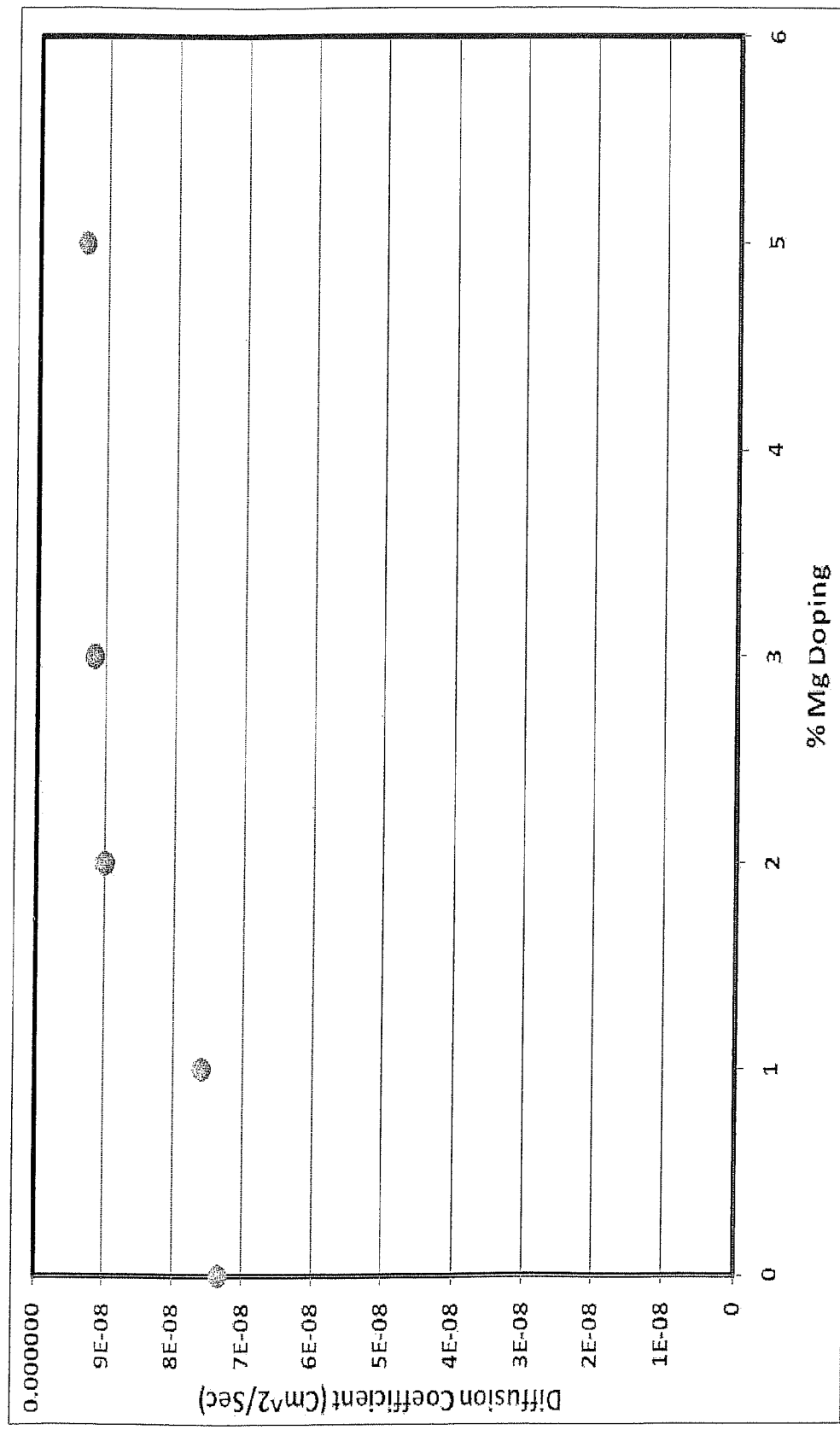
FIG. 20 is a plot of the lithium diffusion constant obtained from complex impedance measurements for batteries formed with uncoated positive electrode active material with non-Mg dopant, 1 mole % Mg dopant, 3 mole % Mg dopant or 5 mole % Mg dopant.

The complex impedance measurements are presented in FIGS. 18 and 19. FIG. 19 is an expanded view of a portion of the plot in FIG. 18. The radius of the initial curved portion is related to the charge transfer resistance. The samples with 3 mole % and 5 mole % magnesium exhibit a reduced amount of charge transfer resistance. Referring to FIG. 18, the upwardly sloped segments are related to the diffusion rates of the lithium from the electrode. The diffusion constants are estimated from the following formula:

$$D_{Li} = (2\pi Z_{imag} \text{Freq} L^2)/(3Z_{real}),$$

where L is the thickness of the electrode. The values of $Z_{imag}$ and $Z_{real}$ are evaluated at the low frequency point, $4.53 \times 10^{-3}$ Hz. The calculated diffusion constants for batteries with the compositions with three different Mg doping levels and with an undoped composition are plotted in FIG. 20. The diffusion coefficient is larger for the doped samples indicating that the lithium can more easily diffuse from the electrodes with magnesium doping.

Figure 21:
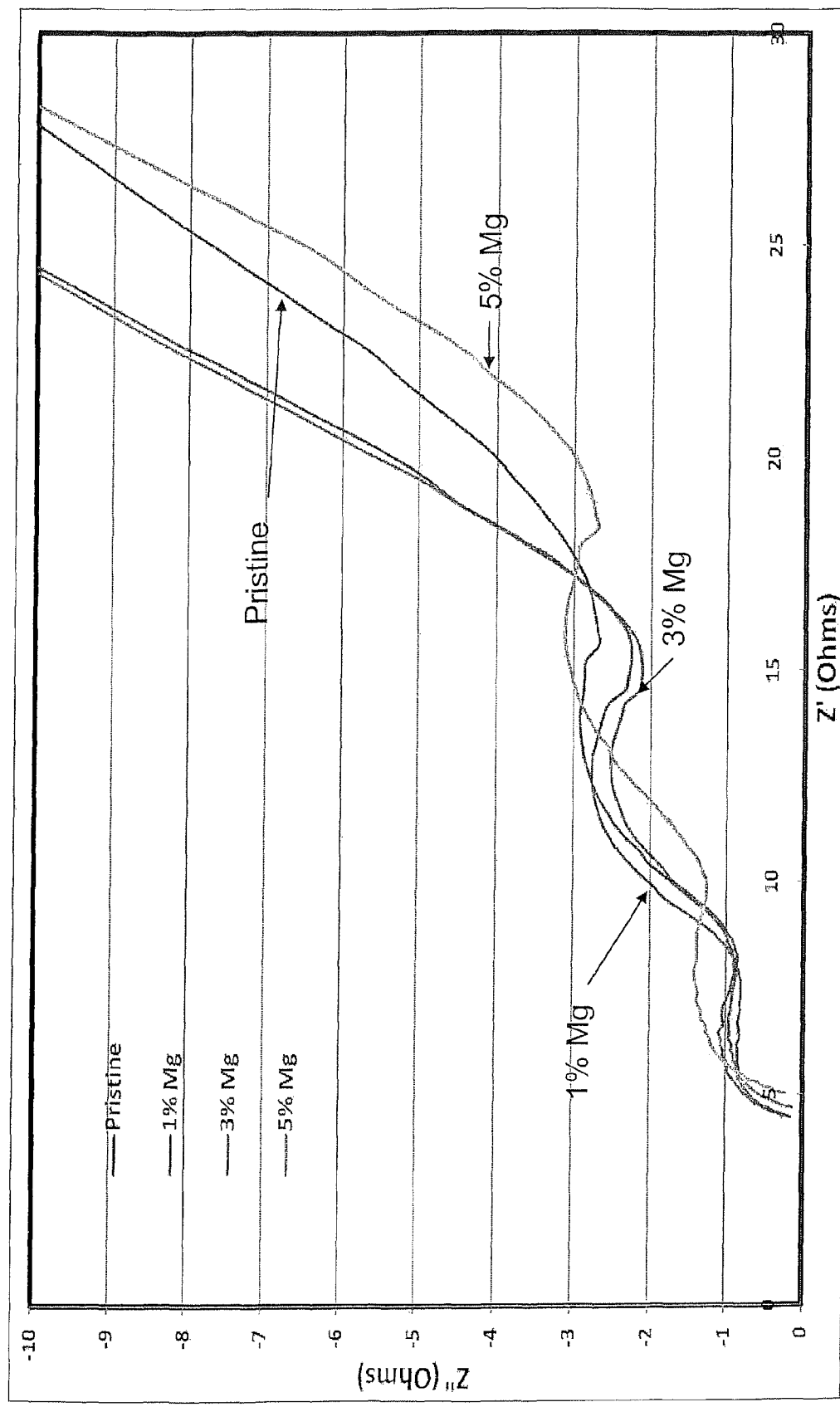
FIG. 21 is a plot of complex impedance for batteries with 100% state of charge formed with uncoated positive electrode active material with non-Mg dopant, 1 mole % Mg dopant, 3 mole % Mg dopant or 5 mole % Mg dopant.

The complex impedance measurements were repeated after discharging the batteries down to 50% state of charge. In other words, roughly have the current capacity of the battery was discharged prior to performing the A-C current measurements. The results are shown in FIG. 21. Two charge transfer steps are seen in this plot. Batteries formed with positive electrode materials having 5 mole % magnesium had increased charge transfer resistance at this state of charge, while the batteries with 1 mole % and 3 mole % Mg had lower charge transfer resistance relative to batteries formed with undoped materials. These results are consistent with the batteries formed with 3 mole % Mg doping as exhibiting the best performance at a high 2C discharge rate as shown in FIG. 9. In other words, the complex impedance measurements are consistent with improved specific capacity at high rates observed with respect to battery performance in the previous examples.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

What is claimed is:

1. A positive electrode active material comprising a layered composite crystalline active composition with a formula $Li_{1+x}Ni_\alpha Mn_{\beta-\delta}Co_\gamma A_\delta X_\mu O_2$,
   wherein x ranges from about 0.01 to about 0.3,
   α ranges from about 0.1 to about 0.4,
   β ranges from about 0.25 to about 0.65,
   γ ranges from 0.075 to about 0.4,
   δ ranges from about 0.01 to about 0.035,
   μ ranges from 0 to about 0.1, and
   wherein A is Mg, Ca, Sr, Ba, Zn, Cd, or combinations thereof and X is a transition metal or a combination thereof other than A, Ni, Mn and Co, and
   a stabilization coating over the active composition,
   wherein the material has a 10th cycle specific discharge capacity of at least about 240 mAh/g at a discharge rate of C/3 when discharged from 4.6 volts to 2.0 volts and wherein the 40th cycle specific discharge capacity is at least about 98% of the 10th cycle specific discharge capacity at room temperature at a discharge rate of C/3 and from 4.6 volts to 2.0 volts.

2. The positive electrode active material of claim 1 wherein the sum x+α+β+γ+δ+μ approximately equals 1.0.

3. The positive electrode active material of claim 1 wherein A is magnesium,
   x ranges from about 0.175 to about 0.225,
   α ranges from about 0.150 to about 0.2,
   β ranges from about 0.52 to about 0.57,
   γ ranges from about 0.075 to about 0.125, and
   δ ranges from about 0.01 to about 0.030.

4. The positive electrode active material of claim 1 wherein the stabilization coating is a metal fluoride coating in an amount from about 3 nm to about 11 nm.

5. The positive electrode active material of claim 4 wherein the metal fluoride comprises $AlF_3$.

6. The positive electrode active material of claim 1 wherein the material has a 10th cycle discharge capacity from about 250 mAh/g to about 270 mAh/g at room temperature at a discharge rate of C/3 when discharged from 4.6 volts to 2.0 volts.

7. The positive electrode active material of claim 1 having a tap density of at least about 1.8 g/mL.

8. The positive electrode active material of claim 1 having a first cycle irreversible capacity loss of no more than about 70 mAh/g at a discharge rate of C/10.

9. A positive electrode comprising the positive electrode active material of claim 1, an electrically conductive material that is distinct from the positive electrode active material, and a binder.

10. The positive electrode active material of claim 1 having:
   an average discharge voltage of at least about 3.63 volts at a discharge rate of C/10.

11. The positive electrode active material of claim 1 wherein A is Mg.

12. The positive electrode active material of claim 10 wherein the material comprises from about 3 nm to about 11 nm metal fluoride coating.

13. The positive electrode active material of claim 10 wherein the material has a 10th cycle discharge capacity from about 250 mAh/g to about 270 mAh/g at room temperature at a discharge rate of C/3 when discharged from 4.6 volts to 2.0 volts.

14. The positive electrode active material of claim 10 having a tap density of at least about 1.8 g/mL.

15. A lithium ion secondary battery comprising a positive electrode comprising the positive electrode active material of claim 1, a negative electrode comprising elemental carbon and a separator between the positive electrode and the negative electrode.

16. A method for the synthesis of a layered lithium metal oxide composition of claim 1, the method comprising precipitating a mixed metal hydroxide or carbonate composition from a solution comprising +2 metal cations, wherein the mixed metal hydroxide or carbonate composition has a selected stoichiometry comprising $Ni^{+2}$, $Mn^{+2}$, $Co^{+2}$ with a dopant concentration from about 0.1 to about 10 mole percent wherein the dopant comprises Mg, Ca, Sr, Ba, Zn, Cd or a combination thereof.

17. The method of claim 16 further comprising the addition of a lithium source in powder form to the metal hydroxide or carbonate composition to form a mixture and heating the mixture to form a corresponding crystalline lithium metal oxide particles.

18. The positive electrode active material of claim 1 for a lithium ion battery having:
   an average discharge voltage of at least about 3.63 volts at a discharge rate of C/10, and
   a 46th cycle discharge capacity of at least about 170 mAh/g at room temperature at a discharge rate of 2C and from 4.6 volts to 2.0 volts.

* * * * *